(12) United States Patent
Han et al.

(10) Patent No.: US 10,184,374 B2
(45) Date of Patent: Jan. 22, 2019

(54) APPARATUS AND METHOD FOR DESULFATION OF A CATALYST USED IN A LEAN BURN METHANE SOURCE FUELED COMBUSTION SYSTEM

(71) Applicant: UMICORE AG & CO. KG, Hanau-Wolfgang (DE)

(72) Inventors: Xue Han, Owsso, OK (US); John Nunan, Catoosa, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/438,029

(22) Filed: Feb. 21, 2017

(65) Prior Publication Data

US 2018/0238216 A1    Aug. 23, 2018

(51) Int. Cl.
*F01N 3/08* (2006.01)
*F01N 3/20* (2006.01)
(Continued)

(52) U.S. Cl.
CPC ............ *F01N 3/206* (2013.01); *B01D 53/944* (2013.01); *B01D 53/9495* (2013.01);
(Continued)

(58) Field of Classification Search
CPC ...... F01N 3/0885; F01N 3/2033; F01N 3/206; F01N 11/00; F02B 2043/103
See application file for complete search history.

(56) References Cited

U.S. PATENT DOCUMENTS

| 5,176,887 A | 1/1993 | Subramanian et al. |
| 5,179,053 A | 1/1993 | Subramanian et al. |

(Continued)

FOREIGN PATENT DOCUMENTS

| EP | 2525066 A2 * | 11/2012 | ........... F02D 41/025 |
| EP | 3 147 471 A1 | 3/2017 | |

(Continued)

OTHER PUBLICATIONS

Leprince, et al. Regeneration of palladium based catalyst for methane abatment. CIMAC Congress Kyoto, Paper No. 210, 2004, 1-5.
(Continued)

*Primary Examiner* — Audrey K Bradley
(74) *Attorney, Agent, or Firm* — Smith, Gambrell & Russell, LLP

(57) ABSTRACT

Apparatus for reactivating a sulfur poisoned oxidation catalyst operating in exhaust of a lean burn, methane source fueled combustion device. Reactivation includes desulfation of the poisoned catalyst through a CO supplementation apparatus communicating with the control unit that is adapted to supplement CO content in exhaust reaching the catalyst, while avoiding an overall rich exhaust atmosphere at the catalyst (e.g., an added supply of hydrocarbons to one or more-of the lean burn engine's combustion chambers as by an ECU controlled extra supply of NG to some of the combustion chambers). Also featured is a method for desulfation of an oxidation catalyst of a lean burn CNG engine by supplying excess CO to exhaust reaching the catalyst while retaining an overall lean state, and a method of assembling an apparatus for reactivating a sulfur deactivated lean burn NG engine catalyst by assembling a CO supplementation apparatus with control unit.

31 Claims, 13 Drawing Sheets

(51) Int. Cl.
*F01N 9/00* (2006.01)
*F01N 11/00* (2006.01)
*B01J 38/04* (2006.01)
*F02B 43/10* (2006.01)
*B01D 53/96* (2006.01)
*B01D 53/94* (2006.01)
*F01N 3/10* (2006.01)
*F01N 3/36* (2006.01)

(52) U.S. Cl.
CPC ............. *B01D 53/96* (2013.01); *B01J 38/04* (2013.01); *F01N 3/0885* (2013.01); *F01N 3/101* (2013.01); *F01N 3/103* (2013.01); *F01N 3/2033* (2013.01); *F01N 3/36* (2013.01); *F01N 9/00* (2013.01); *F01N 11/00* (2013.01); *F02B 43/10* (2013.01); *B01D 2251/204* (2013.01); *B01D 2255/1023* (2013.01); *F01N 2260/04* (2013.01); *F01N 2450/40* (2013.01); *F01N 2550/02* (2013.01); *F01N 2570/04* (2013.01); *F01N 2570/20* (2013.01); *F01N 2590/08* (2013.01); *F01N 2590/10* (2013.01); *F01N 2610/03* (2013.01); *F01N 2610/05* (2013.01); *F01N 2610/06* (2013.01); *F02B 2043/103* (2013.01)

(56) References Cited

U.S. PATENT DOCUMENTS

| | | | |
|---|---|---|---|
| 5,208,204 | A | 5/1993 | Subramanian et al. |
| 5,316,991 | A | 5/1994 | Subramanian et al. |
| 5,318,760 | A | 6/1994 | Subramanian et al. |
| 6,109,024 | A | 8/2000 | Kinugasa et al. |
| 6,217,838 | B1 | 4/2001 | Bourges et al. |
| 6,405,720 | B1 | 6/2002 | Collier, Jr. |
| 7,041,622 | B2 | 5/2006 | Nunan |
| 8,105,561 | B2 | 1/2012 | Hatanaka et al. |
| 8,459,010 | B2 * | 6/2013 | Hancu .................... F01N 3/025 60/274 |
| 8,512,658 | B2 | 8/2013 | Eckhoff et al. |
| 9,328,682 | B2 | 5/2016 | Hoyer et al. |
| 2003/0079520 | A1 | 5/2003 | Ingalls, Jr. et al. |
| 2004/0079060 | A1 | 4/2004 | Alward |
| 2005/0103001 | A1 | 5/2005 | Kupe et al. |
| 2006/0107654 | A1 | 5/2006 | Clark et al. |
| 2007/0012028 | A1 | 1/2007 | Weissman et al. |
| 2007/0077189 | A1 | 4/2007 | Hubig et al. |
| 2007/0093383 | A1 | 4/2007 | Han et al. |
| 2011/0173953 | A1 | 7/2011 | Neels et al. |
| 2013/0312384 | A1 | 11/2013 | Hwang |
| 2014/0301923 | A1 * | 10/2014 | Tang .................. B01D 53/9431 423/212 |
| 2015/0034061 | A1 | 2/2015 | Masubuchi et al. |
| 2016/0082427 | A1 | 3/2016 | Adam et al. |
| 2016/0108833 | A1 | 4/2016 | Choung |
| 2016/0281619 | A1 * | 9/2016 | Kale .................. B01D 53/9495 |
| 2017/0007987 | A1 | 1/2017 | Han et al. |
| 2017/0051649 | A1 | 2/2017 | Han et al. |

FOREIGN PATENT DOCUMENTS

| | | |
|---|---|---|
| FR | 2 913 056 A1 | 8/2008 |
| JP | 2004-346904 A | 12/2004 |
| KR | 2003-0086710 A | 11/2003 |
| KR | 2011-0040587 A | 4/2011 |
| KR | 10-1597181 B1 | 3/2016 |
| WO | 2015/099348 A1 | 7/2015 |
| WO | 2015/167138 A1 | 11/2015 |

OTHER PUBLICATIONS

Hu et al. Sulfur Poisoning and Regeneration of Pd Catalyst under Simulated Emission Conditions of Natural Gas Engine. SAE International. 2007. 2007-01-4037 (9 pages).

Ottinger et al. Desulfation of Pd-based Oxidation Catalysts for Lean-burn Natural Gas and Dual-fuel Applications. SAE International. SAE 2015-01-0991, 1472-1477.

Hagelüken. Autoabgaskatalysatoren, Grundlagen—Herstellung—Entwicklung—Recycling—Okologie [Exhaust Gas Catalysts for Vehicles, Foundations—Manufacture—Development—Recycling—Ecology], 2nd Edition, 2005, p. 206-217.

Donaldson Company Inc. Donaldson is Now Offering Oxidation Catalysts for Compressed Natural Gas Engines. Donaldson Co. Brochure. 2007 (2 pages).

Bach, Christian, et al. Optimized Catalytic Converter for Natural Gas/Biogas Vehicles. World Clean Energy Awards (3 pages). http://www.cleanenergyawards.com/top-navigation/nominees-projects/nominee-detail/project/3/?cHash=1225fd89a9.

International Search Report for International Application No. PCT/EP2018/052169 dated Mar. 21, 2018 (5 pages).

Written Opinion of the International Searching Authority for International Application No. PCT/EP2018/052169 dated Mar. 21, 2018 (6 pages).

* cited by examiner

US 10,184,374 B2

APPARATUS AND METHOD FOR DESULFATION OF A CATALYST USED IN A LEAN BURN METHANE SOURCE FUELED COMBUSTION SYSTEM

FIELD OF THE INVENTION

This invention relates to the technology of catalytically converting emissions from a lean burn combustion device that is a methane source fueled device. Examples of lean burn methane source fueled combustion devices include stationary combustion units such as those used in natural gas supplied power plants and methane source fueled engines such as a natural gas fueled engine. An example of a natural gas fueled engine includes a compressed natural gas (CNG) fueled engine, and the invention is inclusive of an apparatus and a method for catalytic conversion of exhaust gases containing saturated hydrocarbons such as methane that are found in the exhaust of such combustion devices. The present invention is further inclusive of an apparatus and method directed at avoiding sulfur degradation or deactivation of a catalyst used in the emission control of the lean burn methane source fueled combustion device (e.g., an engine such as a CNG engine) through a controlled supply of CO while maintaining the exhaust at the catalyst in a lean state.

BACKGROUND

Methane source fueled combustion devices (e,g, engines), such as lean burn natural gas (NG) engines, are used world-wide for both stationary power generation and mobile applications, inclusive of passenger cars, buses and light and heavy duty trucks. Increased consideration of NG (e.g., CNG) as a fuel supply has been driven by reasons such as an increased availability via fracturing gas extraction technology and also a recognition of potential benefits on the environmental side (and associated assistance in meeting present and anticipated exhaust emission regulations).

For instance, compared to diesel and gasoline engine rivals, NG fuel sourced combustion devices generate fewer pollutants relative to ozone, $NO_x$, and particulate matter (PM). Also, $CO_2$ emissions are reduced because the H/C ratio of NG is about double that of gasoline and diesel fuel.

In the context of the present application, reference to a methane source fueled combustion device is inclusive of, for example, a natural gas (NG) fed combustion chamber used in a stationary power plant and a methane source fueled engine such as an NG fueled engine (e,g., CNG). Methane source fuel supplies include those obtained through oil exploration, coal mining and ocean deposits of methane hydrates.

A further example of a lean burn methane source fueled engine is inclusive of an NG running lean burn mobile vehicle engine, with NG as a sole fuel source for the vehicle engine, as well as the methane source fuel (e.g., NG fuel) as a fuel component of a mixed fuel source supply system to the combustion device such as one that uses NG (e,g., CNG) as a component in a flex-fuel or dual-fuel vehicle (e.g., diesel and NG, or gasoline and NO fuel sources). NG used in vehicles may be classified into CNG and liquefied natural gas (LNG) according to a fuel supply method. The CNG is gas compressed at about 200 atmospheres and is used in a state of being stored in a high-pressure container. The LNG is a cryogenic liquid fuel that is produced by condensing natural gas through cooling of the natural gas to a temperature of −162° C. (−260° F.) while at atmospheric pressure.

CNG relates to natural gas produced out of the ground in a broad sense, but typically refers to combustible gas containing small saturated hydrocarbons as a main ingredient such as methane, ethane and propane with trace levels of butanes and pentanes. CNG is largely classified into oil-field gas produced out of an oil field, coal-field gas produced out of a coal field, and water-soluble gas which is soluble and present in water regardless of occurrence of oil or coal. Each of the coal-field gas and the water-soluble gas contains methane as a main ingredient, and carbon dioxide, oxygen, nitrogen, etc., and is often referred to as dry gas since the gas is not liquefied by pressurization at room temperature. The oil-field gas contains ethane, propane, butane, etc., in addition to the methane, and is often referred to as wet gas since the gas is liquefied by pressurization at room temperature.

Natural gas engines, such as CNG engines, are representative of engines having a fuel source that is predominately methane such that these engines produce emissions that predominately include non-combusted methane-$CH_4$ (e.g., 85%) as well as often other short-chain alkane species (e.g., ethane $C_2H_6$ and propane $C_3H_8$). Thus, the development of catalysts for high efficiency removal of saturated hydrocarbons, including methane, by oxidation within an exhaust stream is of strategic importance.

Even with catalytic assistance, the removal of methane from the exhaust stream is relatively difficult because the C—H bond must be ruptured. A further feature of methane that makes initial C—H bond cleavage difficult is the highly symmetric shape of methane where all C—H bonds are distributed symmetrically about the central carbon at about 109° resulting in the sticking coefficient of methane being very low on metal or metal oxide surfaces. In the oxidation of higher alkanes, oxidation is generally more easily achieved by the cleavage of C—C bonds. Since the C—H bond is stronger, methane is more difficult to oxidize. Since methane is known to be a powerful greenhouse gas with about 20 times the greenhouse potential of carbon dioxide, there has been investigated the use of noble metals and base metals as catalysts for stimulating the oxidation of methane by cleavage of the C—H bond. Alumina, silica, thoria, and titania supported platinum and palladium catalysts were evaluated in 1983 and 1985 (see C. F. Cullis and B. M. Willatt, *Journal of Catalysis,* Vol. 83, p. 267, 1983; and V. A. Drozdov, P. G. Tsyrulnikov, V. V. Popovskii, N. N. Bulgakov, E. M. Moron, and T. G. Galeev, *Reaction Kinetic Catalysis Letters,* Vol. 27, p. 425, 1985). These studies suggested that, under the described conditions, an alumina supported palladium catalyst is the most active, followed by an alumina supported platinum catalyst.

In addition to the treatment of methane, the reduction of non-methane hydrocarbons (NMHCs) from the exhaust of many of these combustion devices (e.g., engines) has also been under consideration and poses challenges. While diesel engines emit very low concentrations of low molecular weight alkalies (e.g., ethane, propane, etc.), these species account for the majority of NMHCs emitted by lean-burn natural gas engines and a fraction equivalent to the natural gas substitution rate for dual-fuel engines. In view of this, more recent investigations have specifically targeted the catalytic oxidation of un-combusted alkanes in order to meet challenging regulatory requirements. For example, the U.S. Environmental Protection Agency (EP) NMHC requirement for heavy-duty on-highway compression-and spark-ignition engines and non-road compression ignition engines is 0.14 g NMHC/bhp·hr (0.19 g NMHC/kW·hr). Also, at least 60% methane conversion is required to meet the stringent European regulations for THC limit values (Tier Euro IV, effective from October 2005).

Accordingly, while methane source fueled engines such as NG engines have the above described advantages (e.g., lower $NO_x$ and particulate matter (PM) production); they also have the drawback of the emission of non-combusted methane and, in many instances, non-methane hydrocarbons (NMHCs).

Additional factors presenting challenges, in the emission treatment of methane source fueled combustion devices, such as NG operating engines, include the often relatively low operation temperature (e.g., 400-450° C.) of such devices, and contaminants such as sulfur dioxide (e.g., 1 ppm or more) in, for example, engine exhaust (e.g., $SO_2$ present in the source of NG or introduced to the exhaust stream such as from engine oil or both).

As noted, it has been reported in the literature that oxidation catalysts containing palladium are, under the described conditions, more efficient as compared to platinum-based catalysts in converting methane. However, while palladium-based catalysts have been reported in the prior art to be the most active for methane and NMHCs abatement relative to those studies, they are also known in the art to have serious limitations. For instance, these palladium based catalysts are highly sensitive to sulfur poisoning and their activities toward $CH_4$ oxidation deteriorate very quickly in the presence of $SO_2$ or $SO_3$, and even more quickly when placed in contact with $H_2S$. Since many methane source fueled combustion devices (such as mobile vehicle or stationary engines, as in NG lean burn engines) contain $SO_2$ within the NG itself (e.g., 1-5 ppm) and/or originating from lubricating oils used in many engines, it has been recognized in the art the limitations of using palladium-based catalysts despite their greater efficiency in methane and NMHC's abatement in the exhaust stream. In addition, water vapor is known to be a strong inhibitor on the catalytic activity of methane (and NMHC) oxidation and therefore must also be considered.

Thus, it is understood in the art that the reduction of unburned hydrocarbon emissions from methane source fueled combustion devices such as engines, as in lean-burn NG engines and dual or multi-fuel (e.g., diesel and natural gas) engines and the like, is particularly challenging due to the stability of the predominant short-chain alkane species released (e.g., methane, ethane, and propane). Supported Pd-based oxidation catalysts are generally considered the most active materials for the complete oxidation of low molecular weight alkanes at temperatures typical of lean-burn NG exhaust. However, these catalysts rapidly degrade under realistic exhaust conditions with high water vapor concentrations and traces of sulfur.

The mechanisms associated with sulfur poisoning and regeneration of Pd-based catalysts used in the exhaust of lean burn NG engines have been studied in the prior art. Examples of studies in this regard can be seen in Leprince et al. *Regeneration of palladium based catalyst for methane abatement;* Paper no.: 210 CIMAC. Congress Kyoto 2004; Hu et al. *Sulfur Poisoning and Regeneration of Pd Catalyst under Simulated Emission conditions of Natural Gas Engine* 2007-014037 SAE International; and Ottinger et al, *Desulfation of Pd-based Oxidation Catalysts for Lean-burn Natural Gas and Dual-fuel Applications* 2015-01-0991 SAE International, As described in the above articles, two primary desulfation strategies have been investigated relative to reactivating poisoned Pd-based catalysts in a lean burn NG engine environment: a) thermal desulfation; and b) reductive desulfation.

Thermal recovery of Pd-based oxidation catalysts has been found to be challenging due to the thermal stability of Pd-sulfur species and the associated minimal sulfur release within suitable (non-damaging) temperature ranges.

Reductive de-sulfation was found to be a better option under the prior art than thermal de-sulfation alone. The above articles describe conversion of the lean burn state in the NG engine with periodic reductive events designed to convert, on a repeating basis, the catalyst exhaust environment over the catalyst from an overall lean air fuel ratio (lambda>1 lean state) to one that is in an overall rich state (lambda<1 rich state). The generation of rich exhaust gas mixtures for engines designed to run under lean conditions is particularly difficult and can have a major negative impact on the drivability and stable operation of the vehicle. In other words, the above described articles all use an overall rich atmosphere to reactivate the catalysts. The same approach of converting a lean burn CNG engine's exhaust from lean to rich in an effort to recover degraded catalyst activity is seen in PCT Publication WO2015167318. One disadvantage of running the Pd-based catalysts under rich conditions is that Pd sinters more rapidly under rich vs. lean exhaust conditions so that re-generation at high temperatures can be detrimental to the overall stability of the catalyst over time. Moreover, an overall rich running state presents a greater likelihood of an increased release of hydrogen sulfide ($H_2S$), which is a more toxic poison relative to Pd, as compared to, for example, sulfur dioxide and other sulfides. An overall lean running engine has a tendency to generate less of the more toxic hydrogen sulfide poison.

Also, in the prior art rich regeneration conditions are considered required since Pd is unique among the noble metals (as in Pt, Pd and Rh) in that elemental S can be incorporated into the bulk of Pd as well as being on the surface. To remove the bulk S, repeated rich-lean cycling is considered required at high temperatures (Ts>700-800° C.). Under rich conditions the elemental S comes to the surface of the Pd/PdO crystallites and then under the lean condition it is readily oxidized to $SO_2$ which is easily desorbed at low temperatures.

A further example of the prior art attempts to offset deactivation of a Pd-based three-way catalyst ("TWC") provided in a CNG engine system through periodic shifts to a rich (lambda<1) atmosphere, is seen by US 2016/0108833. In US '833 there is described a technique, directed at (general) CNG engine catalyst deterioration avoidance, involving engine control adjustments in the air/fuel ratio from 1.0 (stoichiometric) to 0.99 (rich) when a catalyst is sensed to be in a deteriorated state.

However, as noted above, when dealing with a normally running lean burn engine, shifts from lean to rich states for the purpose of CNG catalyst reactivation, are artificial and hard to achieve by, for example, engine control, or require added complexity and/or lower fuel efficiency. Also, as noted above, the rich running state is considered to have a greater propensity to generate the more toxic hydrogen sulfide as compared to a lean running state.

Thus, the common approaches in the prior art to desulfate a catalyst through either high temperature activation above 600° C. or reductive atmosphere treatment, or a combination of both, has proven to be lacking. For example, the temperature required to regenerate a degraded CNG lean burn catalyst has been found to be beyond the operating temperature range for a lean CNG catalyst and the reducing atmosphere (e.g., by engine control) is hard to achieve. Accordingly, the present invention is directed at addressing such problems in the prior art (e.g., the present invention is directed at avoiding or at least alleviating the aforementioned problems associated with the above described various lean burn combustion devices that are methane source fueled as to result in methane coming in contact with the catalyst in stream).

SUMMARY OF THE INVENTION

The present invention is aimed at addressing or alleviating, at least to some degree, one or more of the above described problems and limitations in the prior art, and takes a different approach than the standard regeneration categories of thermal and/or rich catalyst atmosphere regeneration described above. Under the present invention, the different approach utilized to reverse sulfur poisoning of a lean burn methane source fueled combustion device (e.g., engine) emission catalyst, such as an NG engine emission catalyst, includes utilizing engine control, not to create an overall rich lambda atmosphere in the lean hum engine exhaust contacting the catalyst device, but to reverse sulfur poisoning by introducing more CO to the atmosphere in contact with the NG engine catalyst, while retaining an overall lean status in the emission.

As noted, the present invention takes into consideration that methane is harder to burn as compared to CO. For instance, depending on catalyst formulations and testing conditions, CO light-off temperatures can be 200° C. lower than that of methane. By introducing more CO to the exhaust under the present invention, the exotherm generated by CO oxidation can more readily achieve a local thermal treatment effect on a sulfur degraded lean burn methane source fueled (e.g., NG) combustion device (e.g., a vehicle engine) catalyst so as to facilitate a reversal in sulfur poisoning of that catalyst. Thus, a technique featured under the present invention is one that effectively provides an in-situ desulfation/regeneration using the heat from CO oxidation. A second feature of the high and very rapid oxidation of CO over, for example, a Pd CNG catalyst is that the "local" temperature at the Pd crystallites will be very high while at the same time the "local gas composition" may be close to stoichiometry or slightly rich due to the very rapid consumption of oxygen at those localized regions, coupled with limitations in the rate of diffusion of oxygen to the Pd crystallites. Thus the presence of CO coupled with a very high combustion rate can essentially achieve the same effect as that of making the overall exhaust rich as by EMS adjustment, which is highly unfavorable. In other words, the presence of high levels of CO, with its associated fast removal of local environment oxygen under the present invention, can essentially achieve the same effect as that of making the overall exhaust rich, from the perspective of the local environment where catalysis is occurring, i.e. at the Pd/PdO crystallites, The present invention, with its overall lean environment relative to the catalyst, also avoids the degree of hydrogen sulfide generation that can occur under an overall rich atmosphere such as that generated periodically in the prior art rich-lean toggling. The present invention also features a system wherein the added CO in the exhaust provides for a lessening of the impact of water vapor in the exhaust in that CO conversion is less inhibited by the presence of water vapor as compared to methane.

As seen from the examples provided below, under the approach of the present invention, the methane light off temperatures of a sulfur poisoned catalyst can be significantly improved by increasing CO in the feed gas stream and there is also achieved a strong recovery of the catalyst after regeneration (e.g., a final recovery that is about the same or preferably at least within 10-20° C. of the initial light off of the catalyst prior to poisoning). These improvements under the present invention can be seen in the below described testing involving a simulated lean exhaust mixture wherein there is maintained an overall lean atmosphere. The light off temperature is shown under the approach of the present invention to be lowered significantly (e.g., by 300° C.) from the poisoned state. Also, under the present invention, not only does the catalyst perform well when a supplemented amount of CO is present; but, after the CO content is reduced in subsequent light off tests/runs, the catalyst can recover its activity to (or nearly to) a pre-sulfur poisoning level. As further seen by the examples under the present invention, improvements are found both when the exhaust mixture contains only methane and when it contains methane plus other exhaust components such as NMHC's (e.g., when the exhaust contains a mixture of methane as well as the NMHC's ethane and propane).

Since lean burn combustion devices under consideration in the present invention (e.g., such as lean burn combustion engines), are not able to properly generate a sufficient amount of CO in the exhaust to meet the intended states featured under the present invention during normal running operations, to generate enough CO there is featured under the present invention a CO increase operation using a CO supplementation apparatus. As an example of a CO increase operation in accord with the present invention, one or more cylinders (often preferably less than all) of a lean burn, methane sourced fueled engine such as an NG (e.g., CNG) fueled engine are operated in an engine rich mode or richer mode periodically. This rich mode or richer mode in one or more of the engine cylinders is not designed to place the overall exhaust atmosphere in contact with the catalyst into a rich state or lambda<1, but is intended to generate an added quantity of CO to that exhaust atmosphere to initiate an exotheric reaction relative to the CO at the catalyst. The localized exothermic reactions lead to an in-situ increase in temperature in the atmosphere at associated locations on the catalyst as to provide for in-situ removal of the catalyst poisoning sulfur at those locations on the catalyst. Therefore, the sulfur poisoned catalyst will be reactivated via a higher CO exhaust content and associated exotherm. As a result of rich or richer in-cylinder combustion conditions, more hydrogen will also be generated. The increased hydrogen also helps in the localized reactivation of CNG catalysts from sulfur poisoning while there is still maintained an overall lean state at the catalyst.

The method of the present invention is inclusive of working in the presence or absence of other non-methane hydrocarbon(s). In addition, the desulfation effect achieved under the present invention is CO concentration dependent. For example, under embodiments of the present invention and test conditions used, there is suggested that a CO concentration at or less than 1.6% is not as effective as compared to when a CO concentration of at or greater than 3.2% is utilized. The exact concentration of CO in the exhaust and, for example, a required adjustment in engine operation, will depend on the details of the engine operation with respect to overall emissions, temperature at the catalyst, the exhaust flow rate in relation to catalysts volume (i.e. GHSV) and the location of the catalyst relative to the engine manifold. Thus, different lean burn combustion devices, as in engines with different exhaust configurations, will require different levels of CO concentration in the exhaust for full regeneration. That is, the excess CO added is added in an amount designed toward providing highly efficient poison removal while avoiding toggling into an overall rich state as that can lead to undesirable consequences such as an increase in generation of highly catalyst degrading hydrogen sulfide.

Also, embodiments of the present invention include exhaust treatment with Pd-based catalysts, such as Pd only catalysts or Pd-based catalysts with one or more added PGMs (platinum group metals inclusive of ruthenium, rhodium, palladium, osmium, iridium, platinum or any combination of the same). Examples include combinations with Pd such, as Pd/Rh or Pd/Pt or Pd/Pt/Rh catalysts (as well as all possible combinations of the same, as well as varying relative percentages with Pd preferably the highest percentage amongst other PGM's). In addition, the Pd based catalyst of the present invention can also include other non-PGM metal combinations with the Pd such as other base metals of Cu, Ni, Fe, Zr, or any combination of the same as a few examples. The inclusion of base metals such as those described above can be with respect to Pd alone or with respect to any of the PGM combinations described above.

The composition of the oxidation catalyst of the present invention, in addition to the above described catalytic metals, is preferably inclusive of suitable supports on which the metal can be highly dispersed and includes materials such as refractory oxides and mixtures thereof, such as those selected from the group consisting of $\gamma$-$Al_2O_3$, $\delta$-$Al_2O_3$, $\theta$-$Al_2O_3$, heteroatom doped transition Aluminas, Silica, Ceria, Zirconia, Ceria-Zirconia based solid solutions, Lanthanum oxide, Magnesia, Strontia, Titania, Tungsten oxide and mixtures thereof. As described in the background, active alumina supports (e.g., particles on which the metal catalyst is supported) is preferable in many instances in catalytic treatment as in, for example, CNG catalytic treatment.

Embodiments of the invention also include substrate supports on which the Pd-based oxidation catalyst material, such as dispersed Pd metal already supported on a refractory oxide, can be supported. The Pd-based oxidation catalyst material applied to the substrate support, for example, can be in the form of a washcoat slurry. Suitable substrates include a flow through or wall-flow honeycomb body, or it may take on a number of different forms, including, for example, one or more corrugated sheets; a mass of fibers or open-cell foam; a volume of porous particle bodies; and other filter-like structures. Also, if a honeycomb body is utilized, it may be made of suitable heat-resistant materials such as metal and/or ceramic materials. Preferably, the honeycomb body is composed of: cordierite, cordierite-alumina, silicon nitride, mullite, zircon mullite, spodumene, alumina-silica magnesia, zircon silicate, sillimanite, a magnesium silicate, zircon, petalite, alpha-alumina, an aluminosilicate, silicon carbide (SiC), aluminum titanate, or the like, and combinations thereof.

Under embodiments of the invention, there is preferably provided sufficient PGM (e.g., Pd loading) to perform the desired functioning of the present catalyst. Suitable loading of such PGM material includes Pd in the range of 20 to 500 g/ft$^3$ or 40 to 400 g/ft$^3$ or 50 to 250 g/ft$^3$ with or without Pt. If Pt is included with Pd it is preferably provided in the range of 10-100 g/ft$^3$ with a ratio of Pd/Pt of 3:1 to 10:1, or 4:1 to 7:1, or 5:1 being preferred. As seen from the below described examples, the ability to avoid sulfur degradation, and thus also the prior art requirement to compensate for such poisoning (by an increased catalytic material loading), provides in the present invention the benefit of lower catalytic loading requirement for a given system. In other words, an advantage provided by the present invention is the potential for a reduction in PGM content (Pd in particular) in the catalyst utilized. That is, with the lowering of the light off temperature and avoidance of sulfur poisoning through in-situ sulfur removal, the amount of POM catalyst required to meet a predetermined result is lowered.

An apparatus of the present invention features a catalytic system that converts the exhaust gas of a methane source fueled combustion device as in an engine (e.g., an NG such as a CNG) fueled engine (e.g., a mobile vehicle engine such as that for a passenger car, light or heavy duty truck, bus and the like) operating in a lean state. The methane source fueled combustion device can he operated with the methane source fuel as a sole fuel source as in, for example, NG (e.g., CNG) as a sole fuel source in a lean burn engine, or as a component of a multi-fuel source engine (e.g., a flex-fuel or bi-fuel).

An example of a suitable catalyst for use with a lean burn methane source fueled combustion device, such as an engine, as in a CNG lean burn engine, features Pd supported on a rare earth stabilized high surface alumina with optionally other stabilizers and promoters also present such as transition metals inclusive of Zr, and alkaline earth metals such as Mg, Ca, Sr and Ba. Suitable rare earth alumina stabilizers include La, Pr, Nd, and Y as a few examples, which listed stabilizer sources can be used individually or in any of the potential combinations relative to the list above.

The present invention includes a catalytic treatment apparatus for catalytic treatment of exhaust of a lean burn methane source fueled (e.g., NG as in a CNG fueled) combustion device (e.g., an engine), comprising: an exhaust line of the combustion device; a catalyst in the exhaust line; a control unit; and a CO supplementation apparatus in communication with the control unit and adapted to supplement the CO content (to achieve, for example, a programmed, and, hence, predetermined CO content level) in the exhaust reaching the catalyst so as to desulfate the catalyst while avoiding an overall rich exhaust.

An arrangement of the invention features a catalyst that comprises palladium supported on a rare earth stabilized high surface area alumina, such as a Pd-only oxidation catalyst or an oxidation catalyst that comprises Pd and at least a second catalytic metal such as Pt.

An arrangement of the invention includes having the CO supplementation apparatus supplement the CO exhaust content to a predetermined level while retaining an overall lean burn state at the catalyst ($\lambda$>1.0).

For example, a mode of the catalytic treatment apparatus is one that retains the lean state of the exhaust reaching the catalyst, while the supplemental CO content is supplied by the CO supplementation apparatus, such that the overall state of the exhaust gas avoids entering into a rich state such that it is maintained greater than stoichiometric as in; $\lambda$>1.0 (e.g., >1.0 to 20.0); or $\lambda \geq 1.1$ to $\leq 10.0$ and more preferably $\lambda \geq 1.2$ to 5.0 even more preferably $\lambda \geq 1.5$ to $\leq 2.5$ with $\lambda$=2.1 being suited for some examples under the present invention. It is noted that, relative to the broader ranges above, the upper end of these ranges is combustion device system driven (there is utilized a suitable combustion air level for purpose of the desired combustion effect relative to the supplied fuel, while attaining the desired catalyst driven desulfation emission result in accordance with the present invention).

Additionally, an embodiment of the invention features a percentage of CO content in the exhaust that is capable of regeneration/desulfation of the catalyst as described above. The exact concentration of CO needed will depend on such characteristics as the exhaust composition from the lean operating engine, catalyst temperature, and exhaust configuration. The CO concentration that is supplied is at a level and duration that is sufficient for reactivation, but retains an overall lean state in the exhaust reaching the catalyst. For example, the CO supplementation apparatus preferably provides a percentage CO content in the exhaust that is about 1.0 to <7.5% by volume of exhaust at the catalyst, as in 1.0% to 6%, or more preferably, for many situations featured under the present invention, 1.6% to 4.0%, and still more preferably 3% to 4% as in 3.2% to 3.6% by volume (while the exhaust is maintained in an overall lean state at the catalyst). The upper end of the range of 1.0 to <7.5 is an example of a capped end as to overall CO presence in a system, where if exceeded for some systems under the present invention could lead to an undesirable shift from an overall still lean state to one that is in an overall rich state (having the undesirable characteristics such as described above, including an increased propensity for the toxic hydrogen sulfide generation and higher catalyst sintering potential).

An example of the invention further includes a CO supplementation apparatus, an example of which includes a fuel injector device, such as a fuel injector that is in communication with a control unit and is adapted to add fuel to one or more combustion chambers of the lean burn combustion device such as a combustion engine. The fuel injector can he one that is also used to inject a source fuel such as CNG in a CNG operating combustion device such as a combustion engine, but which, under the present invention, is controlled in a different manner than that used in standard operation procedures to provide added CO to the exhaust stream at the desired points in time. This can include a controlled high frequency periodic input of added fuel to achieve the desired, predetermined level of increase in CO content in the exhaust output. Thus, an embodiment features the fuel injector device feeding a common fuel as in CNG fuel of a sole CNG fuel running combustion device such as a combustion engine or one of the component fuels of a multi-fuel running NG combustion device such as a combustion engine for the purpose of controlled CO supplementation while retaining an overall lean state in the exhaust reaching the catalyst.

One technique under the present invention for retaining an overall lean state at the catalyst during a supplementation period (wherein fuel is supplied for controlled CO supplementation) is to have the fuel injector device of the CO supplementation apparatus supply fuel to less than the total number of combustion chambers of a lean burn engine.

An arrangement of the catalytic treatment apparatus of the present invention further includes a catalyst sulfation deactivation state sensor in communication with the control unit, with the deactivation state sensor conveying, for example, information to the control unit that is informative of a level of sulfation deactivation of the catalyst, and when the control unit determines a threshold value of sulfation deactivation has occurred, initiates the CO supplemental apparatus to supplement the exhaust flow with added CO as to achieve a desulfation effect (and it is considered as well, under applicable conditions, that the CO supplementation reverses the derogatory effect that the water poison effect has on catalyst activity).

A further arrangement of the invention includes the CO supplemental apparatus increasing the CO content by way of providing an additional supply of an available fuel through the opening of one or more fuel supply valves based on operation of the control unit communicating with the CO supplement apparatus. Again, this supplemental apparatus is designed to provide sufficient added fuel to reach predetermined levels of added CO content in the exhaust gas reaching the catalyst, but not so much as to lead to an overall rich state in the exhaust reaching the catalyst.

The present invention is also inclusive of a method of enhancing performance of a catalyst operating in a lean burn (methane fuel sourced) combustion device (e.g., engine) exhaust passageway that comprises supplementing the CO content of the lean burn (methane fuel sourced) combustion device (e.g., engine) exhaust so as to rejuvenate the catalyst (e,g., reactivate a sulfur degraded catalyst) while retaining a lean burn state in the exhaust reaching the catalyst during CO supplementation.

The present invention is also inclusive of a method of enhancing a catalyst performance in a lean burn (methane fuel sourced) combustion device (e.g., engine) exhaust passageway, that includes supplementing the CO content of the lean burn engine exhaust so as to reactivate the catalyst (e.g., reactivate the catalyst by removal of sulfur build up on that catalyst) while retaining an overall lean lambda state in the exhaust reaching the catalyst during CO supplementation. For example, in an embodiment of the invention there is featured a lean burn combustion device (e.g., engine) oxidation catalyst with Pd as the, or one of the, active PGM materials, which catalyst is operating in the exhaust passageway of the (e.g., CNG) lean burn combustion device (e.g., engine) and is reactivated by adding, in a controlled fashion, to the CO content of the exhaust, which facilitates the desulfation of that catalyst.

The method also includes the above described CO supplementation step (for increasing the CO content) which results in an exhaust with added CO reaching a catalyst that has both Pd and a second catalytic metal such as a second PGM metal (preferably in a subordinate role relative to the Pd metal so as to constitute a "Pd-based" catalyst). Examples of secondary PGM materials including Pt and/or Rh Embodiments of the invention feature supplementing a typical CO amount used for non-supplemented or normal running of the lean burn engine (e.g., CO contents of 0.1 to 0.5% or 1,000 to 5,000 PPM of non-supplemental CO content in a normal running lean CNG engine with 4300 PPM being used in the below described testing and representing a baseline amount of non-supplemented CO content, which the present invention supplements. The method of the present invention is inclusive of a rejuvenation of an oxidation catalyst used in a methane source fueled (e.g., an NG) lean burn combustion device (e.g., engine) oxidation catalyst that includes supplementing the CO content reaching the catalyst so as to have CO percentage by volume of 1.0% to <7.5%, as in 1.0% to 6.0%, and more preferably, fix many embodiments of the present invention, 1.6% to 4.0% with greater than 2.0% being preferred under illustrative set ups of the present invention, and more preferably at or greater than 2.5%, and still more preferably at or greater than 3.2%, with the upper end of these ranges being designed to preclude a conversion of an overall lean state in the exhaust reaching the catalyst to one that is rich; while providing a good source of supplemental CO or desulfation on the catalyst. For example, arrangements of the invention are inclusive of a CO content of 3 to 4%, as in 3.5% reaching the catalyst, such as a Pd based catalyst (a Pd only or Pd/Pt combination as a few examples).

The method of the present invention also includes a process wherein the catalyst is a Pd based oxidation catalyst and rejuvenation includes desulfation of the Pd based catalyst by way of the CO supplementation wherein the CO supplementation is carried out by supplying additional fuel to one or more combustion chambers of the methane source fueled lean burn combustion devices (e.g., combustion engine). The CO generating fuel can be in common with one of the fuel supplies used for combustion device (e.g., combustion engine) performance, or a fuel supply that is a separate, independent (dedicated) fuel supply and not sourced from the main combustion device's (e.g., combustion engine's) fuel supply or a combination of each. While less preferable in many applications, such as mobile applications, where the supplementation apparatus can take advantage of preexisting equipment in conjunction with a modified control unit or other means to change the manner of normal operation of the system to enhance CO content, alternate embodiments are inclusive of CO source supply units or means as in pressurized tanks or chemical reaction devices that include CO as an output reactant, or the like, to provide the desired added level of CO content reaching the catalyst. An example of a CO supplementation technique includes a control unit triggered CO pulse additions to the exhaust flow upstream or at the catalyst set up.

The present invention features a technique for maintaining high activity in a catalyst contained in a catalytic emission system for a lean burn NG or methane inclusive fuel sourced combustion device (e.g., combustion engine) (either in conjunction with an initial manufacture of a catalytic emissions system or based on a conversion of a preexisting catalytic emissions system). The technique is inclusive of a CO supplementation step which acts to offset the problem of sulfation deactivation, particularly relative to sulfur poisoning of a Pd containing oxidation catalyst designed for light off of methane (alone or with other generated by such combustion devices (e.g., combustion engines)), since Pd containing catalysts, while highly effective in catalytic treatment of methane and other low molecular weight alkanes, have been shown to be particularly sensitive to $H_2S$ and other sulfur containing gases in the exhaust such as $SO_3$ or $SO_2$.

An embodiment of the method of the present invention includes CO supplementation by supplying (e.g., adding to a normal run supply, such as by way of extending the duration of fuel already being supplied, increasing the relative flow volume associated with normal operation, or newly adding fuel to one or more combustion chambers not intended for fuel supply at that time under a normal run mode, or a combination of two or more of these added supply techniques. As an example of a lean retention supplementation mode involving added fuel supply relative to that which would be supplied for a normal running mode (e.g., a peak performance normal running mode), supplemental fuel is supplied to less than all available combustion chambers of the methane source fueled lean burn engine. For example, a portion of CNG fuel of a lean burn CNG engine can be utilized for the purpose of added fuel supply (as by ECU controlled valve opening and closing) to one or more of the combustion chambers of the engine at a time when a normal running mode does not dictate fuel supply to those chambers or in an added quantity compared to that which would be supplied to the chamber(s) during normal running mode. For example, the number of combustion chambers and/or the amount of added fuel to the combustion chambers can be controlled by the ECU control unit so as to achieve a CO desulfation content of 1.0% to <7.5%, while maintaining an overall lambda lean state, at least at the initial contact of the exhaust with the catalyst. More preferably the supplemental CO provides a CO content in the exhaust gas reaching the catalyst of 2.5% to 4.0%, and more preferably 3.0 to 4.0%, while the lean lambda state is maintained at a ratio value greater than stoichiometric and preferably at least 1.1. Alternate embodiments feature controlled or preset addition of CO via CO supplementation using alternate CO supplementation means such as by direct CO injection into the exhaust in front of the catalyst, which is particularly suited for NG fuel sourced power plants.

The present invention is also inclusive of a method of assembling the catalytic treatment apparatus of the present invention or retrofitting a preexisting system by adding a CO supplemental apparatus (for example, a CO supplemental apparatus or means for supplementing the level of CO reaching the catalyst as in an entirely separate assembly or one that makes use of preexisting combustion system components, such as the fuel intake valve assembly feeding a combustion Chamber or the like, with appropriate control unit modifications such as a replacement/supplementation of a preexisting engine control unit or as an added independent CO supplementation control unit preferably working in communication with the preexisting engine control unit). The CO supplemental apparatus is designed to increase CO supply to the catalyst while retaining a lambda lean state in the exhaust reaching the catalyst. For example, under either an initial manufacture of a catalytic emissions treatment system or a retrofitting of a preexisting system, there is carried out a setting up of a control unit to communicate with an added or preexisting fuel injection system for supplemental fuel supply above and beyond what is utilized in the normal running procedure within one or more of the combustion chambers so as to generate added CO while maintaining an overall lean burn state in the exhaust reaching the catalyst being reactivated (as in desulfating a Pd based catalyst from a prior poisoning by $SO_2$).

BRIEF DESCRIPTION OF THE DRAWINGS

Both the foregoing general description and the following detailed description are exemplary and explanatory only and are intended to provide further explanation of the invention as claimed. The below referenced accompanying drawings are included to provide a further understanding of the invention; are incorporated in and constitute part of this specification; illustrate embodiments of the invention; and, together with the description, serve to explain the principles of the invention.

FIG. 7 further shows that the introduction of $SO_2$ leads to a rapid and dramatic loss of light off activity and further that a lean high temperature pretreatment does not recover the initial S-free light-off activity of the catalyst.

DETAILED DESCRIPTION

Figure 1:
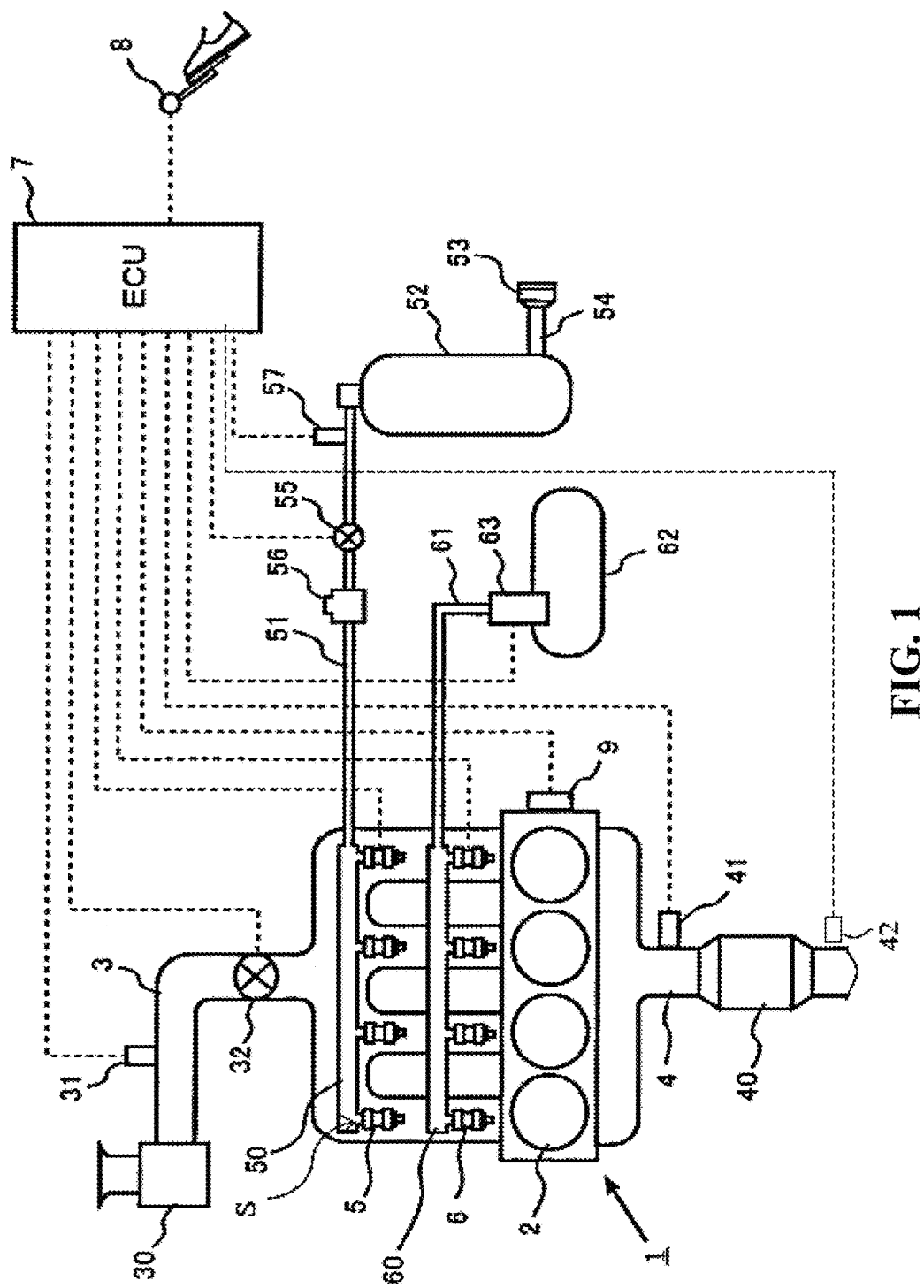
FIG. 1 is a diagram showing the general construction of a combustion device in the form of an internal combustion engine to which the present invention is applied.

FIG. 1 is a diagram showing the general construction of an internal combustion engine to which the catalytic system or catalytic treatment apparatus (CTA) of the present invention is included. The FIG. 1 example features a multi-fuel (CNG and liquid fuel such as gasoline) internal combustion device (engine) 1. The internal combustion engine 1 shown in FIG. 1 is a spark-ignition internal combustion engine having a plurality of cylinders. While the internal combustion engine shown in FIG. 1 has four cylinders, the number of the cylinders may be three or less or five or more (e.g., 1, 2, 4, 6, 6 or 12 as engine examples featured in the present invention).

The internal combustion engine 1 is connected with an intake passage 3 and an exhaust passage 4. The intake passage 3 is a passage used to deliver fresh air taken from the atmosphere to the cylinders 2 of the internal combustion engine 1. The intake passage 3 is provided with an air cleaner 30. The air cleaner 30 is adapted to trap dust in the air. The intake passage 3 is provided with an air flow meter 31 at a location downstream of the air cleaner 30. The air flow meter 31 outputs an electrical signal correlating with the quantity (or mass) of air flowing in the intake passage 3. The intake passage 3 is provided with a throttle valve 32 at a location downstream of the air flow meter 31. The throttle valve 32 varies the quantity of air supplied to the internal combustion engine 1 by varying the channel cross sectional area of the intake passage 3.

The intake passage 3 downstream of the throttle valve 32 forks into four branch pipes, which are connected to the cylinders 2 respectively. To each branch pipe of the intake passage 3 are attached a first fuel injection valve 5 for injecting CNG (an example of a methane source fuel) into the respective cylinders, and a second fuel injection valve 6 for injecting gasoline (liquid fuel) into the respective cylinders. In an embodiment featuring CNG as the sole fuel source, the second fuel valve 6 (and below described liquid fuel supply and associated "fuel valve 6" control means portion would be non-applicable).

The first fuel injection valve 5 is connected to a first delivery pipe 50. The first delivery pipe 50 is connected to a first fuel tank 52 via a first fuel passage 51. The first fuel tank 52 is connected with a filler port 53 provided on the body of a vehicle via an inlet pipe 54. The filler port 53 is adapted to open, in response to insertion of a fuel service nozzle at a CNG fuel station or the like, to allow introduction of CNG supplied through the fuel service nozzle into the inlet pipe 54. The CNG introduced into the inlet pipe 54 through the filler port 53 is stored in the first fuel tank 52.

The CNG stored in the first fuel tank 52 is supplied to the first delivery pipe 50 through the first fuel passage 51 and then distributed to the four first fuel injection valves 5 from the first delivery pipe 50. The first fuel passage 51 is provided with a shut-off valve 55. The shut-off valve 55 provides switching between fuel injection and shut-off of the first fuel passage 51. The shut-off valve 55 is closed while the internal combustion engine 1 is not running (e.g. in the period during which the ignition switch is off) and open while the internal combustion engine 1 is running (e.g. in the period during which the ignition switch is on). An example of a suitable shut-off valve 55 is an electromagnetic valve that is opened when the engine is running and electricity generated and closed when the engine is not running and there is a reduction in electricity generated.

The first fuel passage 51 is provided with a regulator 56 at a location downstream of the shut-off valve 55. The regulator 56 reduces the pressure of CNG supplied from the first fuel tank 52 to a predetermined pressure (set pressure). To put it another way, the regulator 56 is a valve device that adjusts or steps down a higher input pressure sourced from the first fuel tank 52 to a desired outlet pressure which is fed to the first fuel injection valves 5 which are set open or closed based on the control input of controller 7. In this way the fuel pressure in the first fuel passage 51 downstream of the regulator 56 or the fuel pressure acting on the first fuel injection valves 5 and the first delivery pipe 50 (which will be hereinafter referred to as the "fuel injection pressure") is made equal to the set pressure determined to be applicable by the controller 7.

The first fuel passage 51 is provided with a pressure sensor 57 at a location upstream of the shut-off valve 55. It is preferred that the pressure sensor 57 be arranged at a location as close to the first fuel tank 52 as possible.

The second fuel injection valves 6 are connected to a second delivery pipe 60. The second delivery pipe 60 is connected to a second fuel tank 62 via a second fuel passage 61. The second fuel tank 62 is a tank that stores gasoline (or some other fuel source such as diesel). The second fuel passage 61 is provided with a fuel pump 63 for pumping up gasoline stored in the second fuel tank 62. The fuel pump 63 is, for example, a turbine pump driven by an electric motor. The gasoline pumped up by the fuel pump 63 is supplied to the second delivery pipe 60 through the second fuel passage 61 and then distributed to the tour second fuel injection valves 6.

The exhaust passage 4 is a passage used to cause burned gas (exhaust gas) discharged from the cylinders 2 to be emitted to the atmosphere after passing through an exhaust gas purification catalyst device 40 and a silencer, etc. Sensor apparatus 41 can include an air/fuel equivalence ratio or A/F sensing means that outputs an electrical signal correlating with the air-fuel ratio of the measured region of the exhaust passage 4. The A/F sensor outputs an electrical signal for determining the current air fuel ratio across the catalyst device 40 and can take on a variety of forms such as an oxygen sensor with associated voltage meter.

The air-fuel ratio (AFR) is the ratio between the mass of air ($M_{air}$) and mass of fuel ($M_{fuel}$) in the fuel-mix at any given moment. That is: (AFR=$M_{air}/M_{fuel}$). The mass is the mass of all constituents that compose the fuel and air being whether combustible or not. For example, a calculation of the mass of natural gas (NG)-which often contains carbon dioxide ($CO_2$), nitrogen ($N_2$), and various alkanes, includes the mass of the carbon dioxide, nitrogen and all alkanes in determining the mass of natural gas. The air-fuel equivalence ratio ($\lambda$-lambda) is the ratio of actual AFR to stoichiometry for a given mixture. $\lambda=1.0$ is at stoichiometry, rich mixtures $\lambda<1.0$, and lean mixtures $\lambda>1.0$. An embodiment of the present invention features the engine 1 set to operate at a lean mixture or $\lambda>1.0$ (e.g., 1.1 to 20)

The internal combustion engine 1 having the above-described construction is equipped with an ECU 7. The ECU 7 is an electronic control unit composed of, for example, a CPU, a ROM, a RAM, and a backup RAM etc. The ECU 7 is electrically connected with various sensors such as an accelerator position sensor 8 and a crank position sensor 9 in addition to the air flow meter 31, the determination sensor apparatus or means 41 (sensor apparatus or means 41 can comprise a single sensor type or a multiple set of different sensor functioning devices or types), and the pressure sensor 57 mentioned above. The accelerator position sensor 8 is a sensor that outputs an electrical signal correlating with the position of the accelerator pedal (accelerator opening degree). The crank position sensor 9 is a sensor that outputs an electrical signal correlating with the rotational position of the crankshaft of the internal combustion engine 1.

The ECU 7 is electrically connected with various components such as the first fuel injection valves 5, the second fuel injection valves 6, the shut-off valve 55, and the fuel pump 63. The ECU 7 controls the above-mentioned various components based on signal outputs from the above-mentioned various sensors. The ECU 7 of the present invention is able to control the relative on/off states of the first fuel injection valves 5 such that there is provided for independent control as to which injector(s) 5 are feeding CNG into the cylinders and which injector(s) 5 are not.

The ECU 7 for the multi-fuel engine shown in FIG. 1 also switches the fuel utilized based on the sensed current settings such as the relative fuel level in each of the multi-fuel source tanks 52 and 62.

Under the present invention's approach of introducing added CO, via supplementation apparatus S of the CTA, for the purpose of avoiding sulfation build up and/or providing for desulfation of any sulfur build up on the catalyst device 40 shown in FIG. 1, the CO introduction can be implemented on a preset time schedule or one that is based on a monitoring of performance of the catalyst such as by way of providing a deactivation monitoring sensor function to sensor apparatus 42. Which can be a dedicated measure of the state of deactivation of the catalyst 40 (e.g., a methane bypass sensor) or one that is multi-functional, but one that in any event provides information indicative as to the present state of deactivation of catalyst 40. In a preferred embodiment the CO supplementation is tied in with the activity of catalyst 40 (e.g., a lower level of activity due to sulfation poisoning can be sensed as by way of how much methane escapes or bypasses the catalyst). If such a condition is received by the ECU, appropriate CO supplementation activity can be activated by the ECU and provided by supplementation apparatus S.

Alternatively, if a preventive mode is desired the ECU 7 can implement a preset supplemental fuel schedule to achieve the desired repeated CO supplementation runs in the exhaust line at the catalyst. In this mode, the ECU 7 (or an independent, dedicated supplemental fuel implementation control unit with attributes similar to the above described ECU 7) can be set up to initiate a preset increase in CO present in the exhaust flow on a preset time basis and time duration (e.g., periodic initiation of CO supplementation for a time period sufficient to raise the CO level in the exhaust gas as in an increase of CO in a range of 1.5% to 4% concentration by volume for a sufficient period of time to achieve a level of desulfation. within the periodic interval of CO supplementation). In many embodiments of the present invention, however, CO supplementation is carried out after a perceived or monitored level of sulfur build up and not on a fixed schedule that provides supplemental CO without monitoring the sulfur build up on the catalyst.

Implementation of the increase in CO is carried out under an example of the invention by an increased fuel supply to the combustion device (e.g., the CNG source or an alternate source, as in another fuel source in a multi-fuel sourced engine or an independent alternate fuel supply not utilized for general combustion device performance). With reference to FIG. 1, this can be carried out a CO supplementation step by adding or supplementing, via the ECU control 7 and the CO supplementation apparatus S, the amount of CNG fuel supplied to one or more of the cylinders C1 to C4. For example, there can be carried out an ECU triggered/controlled manipulation of the CO supplementation fuel supply valving 5 for a period of time suited for a desired desulfation result. For instance, valve manipulation can be utilized, e.g., opening one or more valves that are normally maintained in a closed state during the applicable normal running period, or maintaining for a longer time one or more of the valves in an open state, as compared to the normal run time period of the valve(s) feeding the cylinder(s) with the CNG fuel supply.

Alternatively, an increased flow rate within a common time period in one or more of the cylinders over that rate used for normal miming can be utilized for CO supplementation. That is, some or all cylinders can have a supplemental CO supply above and beyond what is implemented for a standard or typical flow condition under that current engine operating condition, although care is taken under the present invention to avoid altering an overall lean engine operation to one that generates or passes into a rich overall operation state. For example, there also can be utilized the sensed lambda value for the engine operation, such as by way of the interplay between sensor apparatus 41 and/or sensor apparatus 42 and the ECU monitoring of the lambda value such that a cap voidance value (an early triggering if the tendency is suggesting potential later entry into an overall rich condition if steps are not taken currently) is set at, for example, stoichiometric or close to stoichiometric on the lean side (e.g., 1.05) to retain overall lean condition, but with an added amount of CO to the exhaust stream.

Thus, under the present invention there can be monitored the activity level associated with the oxidation catalyst by a sensing of any indicator that is informative of sulfur poisoning in the operation of the catalyst device 40. For example, such monitoring can be by way of either sensor apparatus 42 or a combination of sensor apparatus 41 and sensor apparatus 42, with one or both of sensor apparatus 41 and sensor apparatus 42 being potentially inclusive of multiple sensing functions. For example, one preferred, direct approach is to monitor methane breakthrough past catalyst device 40 with a methane sensor such as with sensor apparatus 42 downstream of catalyst device 40. The sensed level of methane breakthrough downstream of catalyst device 40 can be determined with a methane level sensor function provided in sensor apparatus 42, and the trigger CO supplementation need level can be based on a preset range of lowered performance acceptance before a triggering of the supplemental CO (and preferably also accompanying $H_2$ production). Preferably there is set a trigger level as to catalyst degradation that maintains catalyst operation above a regulated level so as to avoid the release of a quantity of methane (and NMHC's if present) that would violate a regulatory set level. In this way, there is avoided over implementation of the CO supplementation due to sensing fluctuations, etc., while also ensuring that the catalyst performance avoids violating a regulatory standard under consideration.

A person skilled in the art, with the benefit of the present description, would be able to provide an engine controller that can be used here in order to be able to carry out the CO supplementation strategy according to the invention for the exhaust-gas purification system (Electronic Engine Controls, 2008, ISBN Number: 978-0-7680-2001-4). Again, with the benefit of the present disclosure, said person skilled in the art would also be likewise familiar with sensors which may be taken into consideration for measuring the CO supplementation criteria (e.g., $NO_x$ threshold values, methane levels, and lambda value) (e.g., see Christian Hagelüken, *Autoabgaskatalysoren, Grundlagen-Herstellung-Entwicklung-Recycling-Ökologie* [*Automobile exhaust-gas catalytic converters, fundamentals-production-development-recycling-ecology*], Expert Verlag, $2^{nd}$ Edition, pages 188 et seq., in particular page 206 et seq.)

Although a variety of sensing parameters, such as the above noted $NO_x$ passage level, can he used as an indicator of a level of sulfur degradation in a catalyst, a direct methane escape level monitoring can be utilized as to better rule out other (non-sulfur degradation) causal issues that might influence a level reading. Thus, sensor apparatus 42 can comprise a direct methane detector that can determine the methane level in the exhaust flow departing the catalyst device 40 and determine if there has been a level of degradation in the methane conversion performance indicating a sulfur degraded catalyst is present. In an alternate embodiment, both sensor apparatus 41 and 42 function to monitor methane levels in the respective gas flow regions (e.g., an upstream region leading to the middle of the catalyst 40 and a downstream region departing the middle of the catalyst 40 (as in sensing at the release point of exhaust downstream of a catalytic canister represented by catalyst device 40)). In this way the amount of methane received by the catalyst and the amount of methane not removed by the catalyst can be determined by the methane amount differential between the upstream and downstream monitoring locations such that a degraded catalyst can be determined.

An additional example, as to the various approaches available for monitoring for when a desulfation level suggests a CO supplementation mode will be helpful, includes dispensing with the attachment of sensors such as downstream of the lean burn engine catalyst 40. Rather, reliance is placed on respective CO supplementation criteria (sulfur degraded catalyst performance criteria) that is/are obtained on the basis of the data of the engine characteristic (historical data for that engine or that type of engine operating under similar conditions) and by computer calculation. For example, poorer engine performance for a given set of circumstances can be monitored and used as an indicator of catalyst attributable to sulfur poisoning catalyst degradation. A direct measurement of methane bypass levels or characteristics is, however, better suited under many examples of the present invention as it is better able to rule out other types of degrading influences on the catalyst such as a high temperature/sintered degraded catalysts.

As described above and as seen in FIG. 1, sensor apparatus 41 and/or 42 is/are preferably designed to include either or both of a function of monitoring the oxidation performance of catalyst device 40 relative to oxidation of a component in the exhaust flow of the NG (e.g., CNG) engine and a direct measurement of methane bypass. For example, sensor apparatus 41 and/or 42 is/are designed to sense the level of activity of the catalyst, as by a monitoring of methane passing past the catalyst and/or by any one of the other techniques described above (or via the above described sensor-less, engine performance and computer calculation based on pre-stored data indicative of the performance level for the catalyst alone or in combination with a more direct, confirmatory sensing as with a methane bypass sensor). Such degradation monitoring sensing is thus carried out by sensing means such as that described immediately above.

Figure 2A:
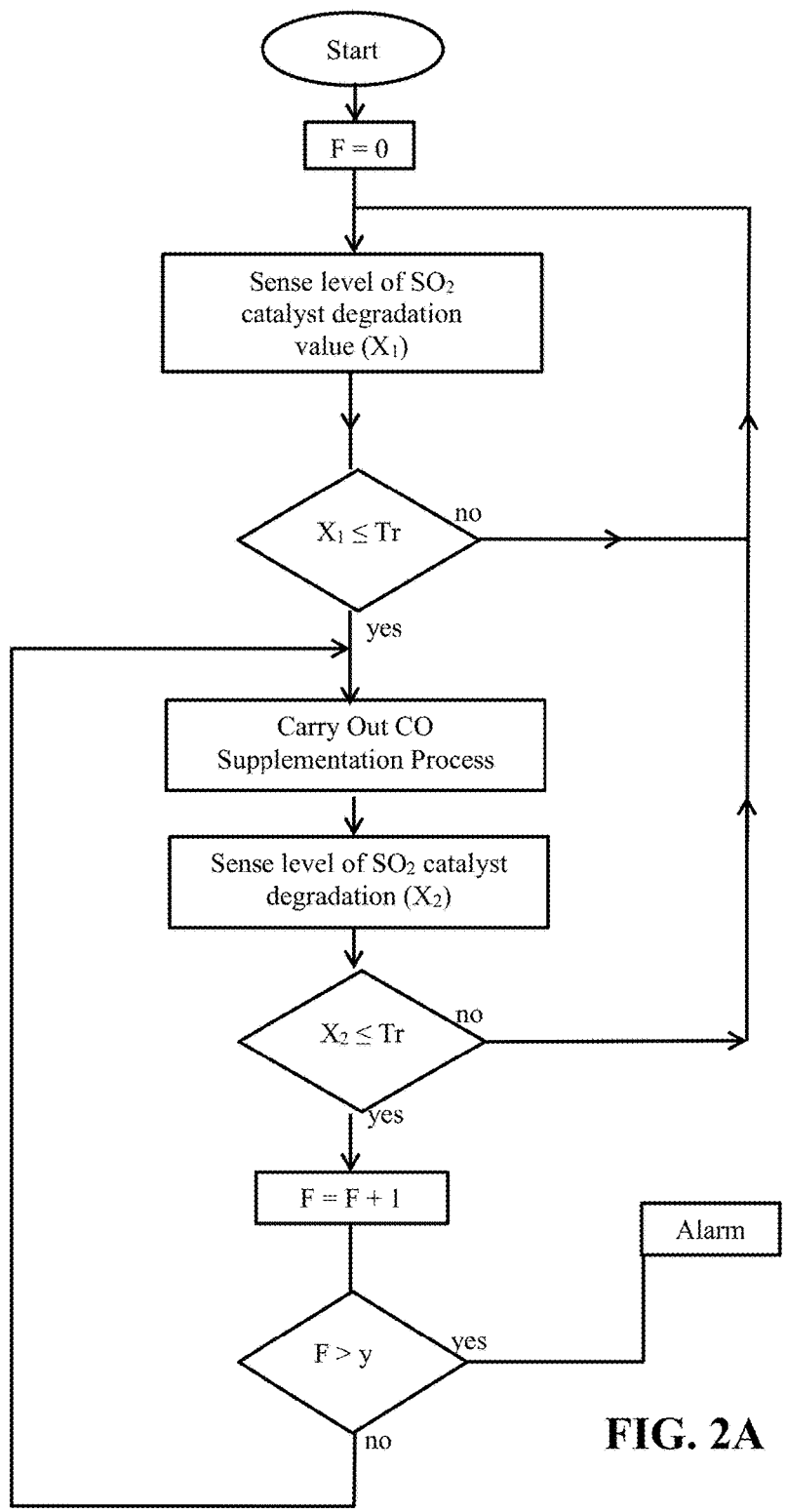
FIGS. 2A and 2B show different approaches involving the use of a dedicated ECU with a CO supplementation apparatus that work together to achieve an increase in the CO content for a given time period or periods in the exhaust flow for the purposes of lean CNG catalyst desulfation.

FIG. 2A shows one example of a sequence of steps that can be carried out under the present invention involving the ECU 7 (or added dedicated control unit in communication with ECU 7) for generation of increased CO (either by way of an added level of CO content from that normally used, or an extended duration of supply as to that which would normally be provided for desired engine performance, or a combination of an added level and an added duration of supply from the norm). This supplementation can be achieved, for example via CO supplementation in the exhaust flow for the purposes of lean CNG catalyst desulphation (e.g., a catalyst treatment apparatus featuring CO supplementation apparatus or CO supplementation means S working together, via reception and output means of the supplemental apparatus S such as electronic open and close valve triggering and mode position confirmation means (not shown) in the valves, with an associated CO supplementation programmed portion of the ECU (or some other control means)). One embodiment of the invention features CO supplementation apparatus S that is in fuel supply communication with a fuel source, and has a fuel passageway and a controllable valve structure (as by control unit signal reception and transmission coordination with the reception and output means of the valve structure), which valve structure is suited for an in-feed of supplemental fuel to one or more combustion areas upstream from catalyst device 40.

FIG. 2A shows a sequence of steps, involving the ECU and supplementation apparatus S, for generation of increased CO in the exhaust flow for the purposes of lean CNG catalyst desulphation. As seen upon initiation of the desulfation monitoring-with-supplementation (if needed) program, a flag is set to zero, and there is initiated a sensed level of catalyst degradation (e.g., a sensed lower activity level in the catalyst indicative of catalyst degradation) using, for example, any of the above described sensing methods, with a methane bypass sensing means preferred for some examples. A comparison is then made relative to the sensed level "X1" relative to a predetermined triggering threshold for the CO supplementation program. For example, the sensed value "X1" (with "X1" being any informative representation of the level of degradation of the catalyst (such as a methane conversion percentage for a sensed temperature of the catalyst; which, if below a predetermined level, is deemed to be a catalyst that has been $SO_2$ poisoned as to require regeneration via the CO supplementation process of the present invention)). If the sensed value X1 is deemed to fall at or below a triggering threshold level, the CO supplementation is carried out as shown in FIG. 2A. If, however, the sensed value X1 is determined not to be less than or equal to the trigger value Tr, the program returns to a periodic sensing routine controlled by the control unit (e.g., ECU 7). Although not shown, a reverse triggering relationship determination can be made under examples of the invention as when Tr is, for instance, based on a methane escape level (rather than an amount reduced or converted) which upon exceeding a slip threshold level triggers CO supplementation (X1 equals the sensed methane slip amount which, when greater than Tr (as the minimal value that can be released without CO activation) starts CO supplementation).

As further shown in FIG. 2A, if the X1 reduction level across the catalyst is found to be at or below the trigger value "Tr", CO supplementation is initiated by the CO supplementation means under control of the ECU such as by supplying added CNG to one or more of the combustion chambers (C1 to C4) so as to provide greater CO content in the exhaust reaching the catalyst device 40, while still retaining an overall lean run state in that exhaust reaching monitored catalyst device 40. Alternatively, or in addition thereto, there can be extended the time period of normal fuel supply to the engine with the duration time period for fuel supply being extended beyond that which is normally relied upon during normal running or there can be a greater pressure, higher flow rate as that used under normal operation. That is, the supplementation in this case is provided with more of an added time duration supply or a greater mass flow rate for a common period as normally used to achieve the desired higher CO contact with the catalyst being regenerated. The supplementation in examples of the invention provides a CO content at the catalyst of 3.0% to 4.0% (e.g., 3.5%) in the exhaust reaching the catalyst with the time period of such oversupply being preset to achieve a desired level of desulfation at the catalyst.

Following the supplementation (as in a programmed added CNG fuel supplementation period at a predetermined flow rate to the noted one or more combustion chambers, the catalyst device 40 is again sensed for level of activity (which, in reverse, is indicative as well as the level of degradation) and the current sensed value "X2" is again compared against the threshold value Tr to see if the last reactivation or regeneration treatment worked. Upon confirmation that the desulfation process has worked, the program is returned to the scheduled ECU monitored (time repeating) sensing mode to monitor to see if the catalyst again moves to a sulfate poisoned state requiring the CO supplementation activity under the present invention. If, despite, the CO supplementation, the again sensed value X2 remains below or at the trigger threshold value, repeated CO supplementing is carried out (either in the same fashion as previously carried out or via a ramped up treatment involving an added extension of time at a prior supply level or an increase in the overall supply as in a bump up in CO content from a normal running nominal amount to, for example, 3% to 4% for a desired time period or a combination of each).

The number of repeated attempts of CO supplementation is monitored (F=F+1) and if the current value F reaches a threshold value "Y", there is deemed to be a situation where the catalyst device 40 is riot recoverable, at least at the current time, and an "alarm" signal is sent out such that the ECU can keep abreast of the performance or current condition of catalyst device 40.

Thus, as an example of a method of reactivation of a degraded lean burn CNG engine oxidation catalyst device 40, the sensing means (e.g., 42 and/or (41 and 42)) is interpreted by the ECU 7 (or a more specific, dedicated control unit such as one in communication with ECU 7), wherein the ECU (or noted more dedicated control unit) determines whether or not a preset value of sulfur degradation in the catalyst has been reached. If that level is deemed to not have been met (i.e., the catalyst is deemed not to have been sufficiently degraded by sulfur such that restoration is deemed not required at the present time), the program returns to pre-sensing status (e.g., a timed periodic check of the status).

Thus under the method of the present invention, if the level of sulfur degradation of the catalyst is deemed to meet a triggering threshold value, the CO supplementation means S is activated by the applicable control unit (e.g., ECU 7) such that an added supply of CO is provided to the exhaust passing over the catalyst material of catalyst device 40 while there is still retained an overall or general lean exhaust atmosphere over that catalyst material of catalyst device 40. In one mode of supplementation under the present invention, the CO supplementation process includes a control unit triggering of an opening of preferably less than the total number of CNG supply valves (e.g., only combustion chambers C1 and C4 relative to the overall combustion chambers (C1, C2, C3, C4)) such that the limited number of combustion chambers are supplied with an extra amount of fuel (resulting in a supply of CO that is more than that suited or applied in standard engine running performance). In this way, a desired amount of supplemental CO is provided to the catalyst. This lessening or limiting of the usage of fuel supply to the combustion chambers is made in an effort to preclude moving the overall exhaust output into an overall rich state, that might occur, for instance, if all four combustion chambers were to be provided with an excess amount of fuel such as the CNG fuel via line 50 and the respective fuel supply valve(s) 5. For example, a "nominal" amount of CO presence featured in standard running programming (e.g., 4300 PPM, or less than 1.0% (1%=10,000 PPM)) is supplemented such that there is greater than that nominal amount as in a greater amount of 1.0% to <7.5%, and more preferably 2.0% to 6.0% CO in the exhaust, and more preferably a range of 2.5 to 4.0% CO by volume in the exhaust gas passing through the catalyst, and still more preferably, in many uses of the present invention, a level of 3.0% to 4.0% as in 3.5% (35,000 PPM). A range of CO supplementation. that is in the region exceeding 7.5% can result in a toggling from an overall lean state to an overall rich state, with the latter situation being undesirable under the present invention (e.g., an increase in the more harmful hydrogen sulfide generation). The 3% to 4% level range described above provides for rapid desulfation/reactivation in many invention environments, while safely maintaining an overall lean state at the catalyst under a variety of arrangements for the combustion device system of the present invention.

Figure 2B:
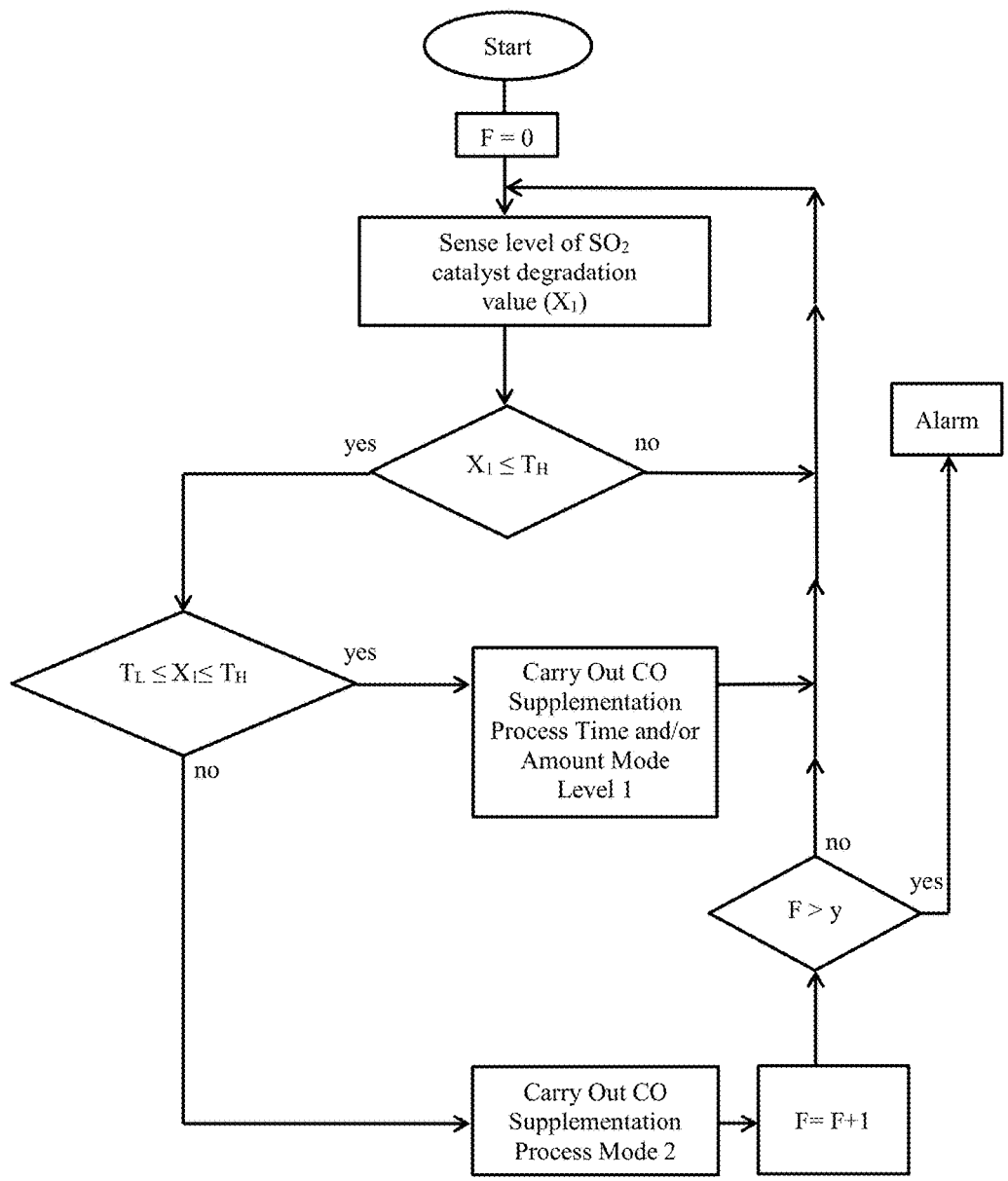

FIG. 2B shows a variation in the sequence of steps involving the ECU for generation of increased CO in the exhaust flow for the purposes of catalyst (e.g., lean CNG exhaust catalyst) desulfation. In FIG. 2B there is carried out similar steps as in FIG. 2A relative to determination of value X1. Following a sensing of value X1 there is initially determined whether X1 is at or below a higher threshold trigger value $T_H$ if X1 is not at or below $T_H$, the sensing cycle controlled by the ECU determines that the degradation level of catalyst 40 is not yet problematic and can be maintained without CO supplementation. If it is deemed that the sensed value X1 is less than or equal to $T_H$, a further determination is made as to whether X1 fails within a range between a lower (or poorer performance) threshold value $T_L$ and $T_H$. If X1 is deemed to fall within the illustrated $T_L$ to $T_H$ range, a CO supplementation process is initiated by the ECU at Level 1 (e.g., an added fuel supply to the one or more combustion chambers of a combustion device and/or a retention of a prior set fuel level supply for an added given amount of time, despite a normal running mode suggesting for a lowering in the supply amount for a given combustion device normal running mode at the review time point). If instead the value X1 does not fall within the noted range (and is thus below $T_L$), there is initiated a CO supplementation process at Level 2. A Level 1 process can entail a lesser amount of CO supplementation generation as by, for example, a shorter timeframe input of CNG into the cylinder (s), a lesser CNG input flow rate to the predetermined cylinder(s); and/or a lower number of combustion chambers involved than that featured in a Level 2 CO supplementation process described below (or any combination of the three noted approaches for Level 1). For example, a Level 1 CO supplementation can entail a 1.6%, by volume, CO content in the exhaust reaching the catalyst, while a Level 2 CO supplementation can entail a 3.2% by volume CO content in the exhaust reaching the catalyst. Thus, there can be utilized a higher threshold value that is directed at efficient engine running performance well within any regulatory standard under consideration and a more aggressive approach when it is sensed that the level of degradation could result in a below regulation level if not addressed properly.

Thus, if Level 2 is implemented, the ECU can trigger a greater CO supplementation in an effort to regenerate what is considered to he a more degraded ($SO_2$ poisoned) catalyst 40 (as compared to Level 1). The enhanced CO supplementation can include, for example, (and as compared to Level 1), i) a greater timeframe input of CNG into the cylinder(s), ii) a greater CNG input flow rate to the predetermined cylinder(s ) iii) a higher number of combustion chambers involved, or iv) an added time period extension of a preexisting normal feed amount to all cylinders during a time period when normal engine control dictates a reduction is in supply amount for normal running as compared to that featured in the Level 1 CO supplementation process described above (or any combination of the i) to iv) noted approaches for Level 2). The resultant outcome under Level 2 operation is an overall greater supply and/or duration of supplemental CO to the catalyst 40 as compared to a Level 1 implementation. Under this approach the amount of CNG (or other supplementation CO fuel) used for supplementation of CO can be more finely controlled as to better fit the status and avoid overuse of CNG (or other supplementation CO fuel utilized) while still retaining an overall lean state. In other words, the two stage application can provide a more nuanced approach that helps avoid too much CO content in the exhaust to help avoid an overall lean to rich switch, and yet still provide for a maximized or more efficiently high level of sulfur removal when needed.

Thus, under the method of the present invention, upon adding additional CNG (or an alternate extra CO external source, such as one derived from an alternate engine fuel source as in a flex-fuel option or an independent one assigned to provide CO supplementation) to the one or more combustion chambers, there is generated added CO (and if an HC fuel source is utilized there is also added $H_2$) in the exhaust stream reaching catalyst device 40. The lower light off temperature of the CO provides for an exothermic temperature increase over the oxidation catalyst which provides for a controlled localized regeneration of the catalyst as the sulfur degrading the catalyst is removed.

EXAMPLES

To illustrate the improved performance of the present invention through use of the present invention's CO supplementation apparatus and method used fur the purpose of desulfation of catalysts subject to exhaust gas contamination, some examples and comparisons are described below.

Testing Equipment Set Up

Figure 3:
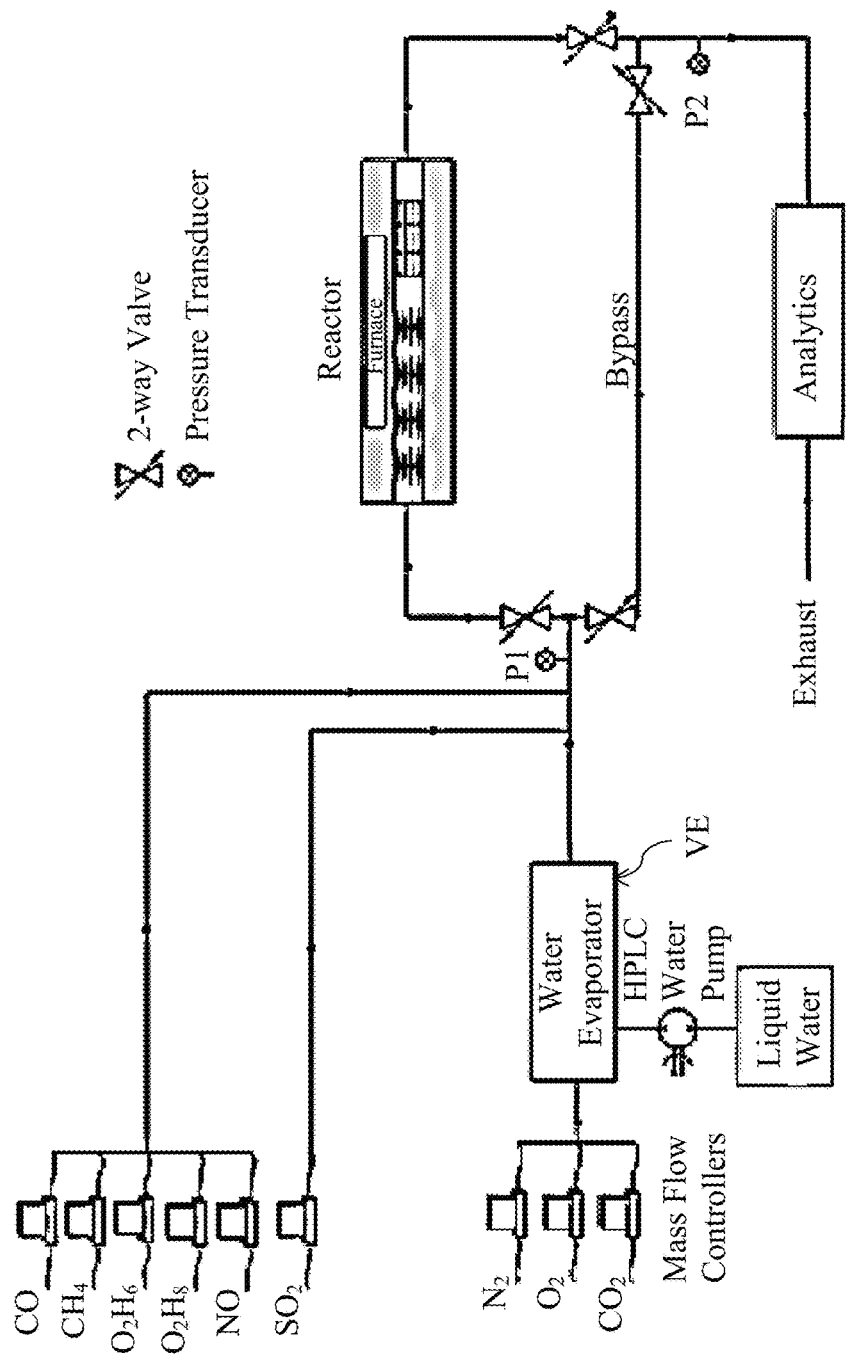
FIG. 3 shows a schematic illustration of a CNG test bench equipment set up for carrying out tests such as the comparative and present invention tests described herein.

FIG. 3 shows a schematic illustration of test equipment suited for use in analyzing samples representing the present invention and comparative examples. That is, FIG. 3 shows a schematic illustration of CNG engine simulation test equipment set up for comparative and present invention analysis. As shown in FIG. 3 there is provided a variety of different gas sources that are flow controlled via mass flow controllers or MFC's. The MFC's provide gas blending to obtain the desired flow volume percentages travelling through the test system and can be used to block off any flow, which facilitates making the gas blend comparisons described below.

As further shown in FIG. 3, there is provided in the test equipment the option of $H_2O$ vapor delivery via the illustrated vapor generator or vaporizer equipment VE. As described above, water vapor can also degrade the performance of catalytic operation and thus is factored into the testing to further present some anticipated environments of use of the present invention.

FIG. 3 also illustrates an electric oven or heated chamber that is used to heat samples and also exhaust leading to those samples as to obtain desired environmental states for the catalyst samples being tested.

The analytic components of the testing equipment, used for generating the below described examples include a heated FID-Total Hydrocarbon analyzer. That is, the present testing equipment features an FID analyzer that measures the total HC via the FID's carbon count. For monitoring of CO and $CO_2$ concentration levels, the analytic testing equipment further included Non-Dispersive Infra-Red (NDIR) detectors. That is, each constituent gas in a sample will absorb some infra-red at a particular frequency. By shining an infra-red beam through a sample cell (containing CO or $CO_2$), and measuring the amount of infra-red absorbed by the sample at the necessary wavelength, an NDIR detector is able to measure the volumetric concentration of CO or $CO_2$ in the sample.

The monitoring of $O_2$ concentration levels, with the analytical testing components of the FIG. 3 test equipment, was by way of the paramagnetic method. Paramagnetic technology features two nitrogen-filled glass spheres that are mounted within a magnetic field, on a rotating suspension, with a centrally-placed mirror. Light shines on the mirror and is reflected onto a pair of photocells. As oxygen is attracted into the magnetic field, it displaces the glass spheres, causing suspension rotation which is detected by the photocells. This generates a signal to a feedback system, which passes a current through a wire mounted on the suspension, creating a motor effect. This current is directly proportional to the concentration of oxygen within the gas mixture.

The analytic equipment of the present invention also features a chemiluminescence—reference analyzer which measures nitrogen dioxide ($NO_2$) and oxides of nitrogen ($NO_x$) based on the reaction of nitric oxide (NO) with Ozone ($O_3$):NO molecules react with $O_3$ to form excited $NO_2$ molecules. If the volumes of sample gas and excess ozone are carefully controlled, the light level in the reaction chamber is proportional to the concentration of $NO_2$ in the gas sample.

FIG. 3 also shows bypass plumbing which was utilized to analyze gas blends for conversion calculations. In addition to providing greater flexibility as to the blend of gasses to reach the catalyst, there are a variety of MFC controlled gas sources, some or all of which can be utilized in the testing (e.g., methane $CH_4$ only or a blend of methane with other HC sources as in the below described, methane $CH_4$ (95%)/Ethane $C_2H_6$ (4%)/propane $C_3H_8$ (1%), HC gas mixture which is representative of some NG running engine exhaust mixes).

Gas Blends Tested

The base gas blend components, flow rate and concentration utilized as the base foundation in the Example testing of the present invention are referenced in Table 1 below together with the substrate dimensions and mixed gas flow rate (gas hourly space velocity or GHSV) across the sample catalyst. Variations in the base amounts shown in Table 1 under the present invention are referenced in the discussion below.

TABLE 1

| | Concentrations |
|---|---|
| NO | 1000 ppm |
| CO | 4300 ppm |
| $CH_4$ | 1000 ppm |
| $O_2$ | 4% |
| $CO_2$ | 13% |
| $H_2O$ | 10% |
| $H_2$ | 1433 ppm |
| $SO_2$ | 0 ppm |
| GHSV | 30,000 $h^{-1}$ |
| Drillcore | 1" × 3" |

Table 1, illustrates the base reference gas flow with modifications being controlled. For example, the Table 1 parameters are applicable except where there is referenced below a parameter variation (e.g., conversion of methane only to a mix of methane, ethane and propane in place of methane only).

Catalyst Utilized

For each example test and comparison test a common catalyst core size, dimension and cell density was utilized. That is, the catalyst used for running the present invention examples and comparison examples consisted of 1" round by 3" long (2.54×7.62 cm) cordierite core, having a cell density of 400 cells per square inch (62 cells/cm²) and a cell wall thickness of 6.5 mil (0.17 mm).

The cores were washcoated with PGM material supported on gamma alumina based supports ("ABS"). Detailed slurry making and washcoating procedures can be found in U.S. Pat. No. 7,041,622 B2 which is incorporated herein by reference for background discussion purposes only.

Thus, under the testing procedure carried out for an example of the present invention, the oxidation catalysts evaluated were all Pd-based catalyst, with the active materials (i.e., Pd alone in this testing series) dispersed on high surface area alumina ("ABS") which was coated onto a cordierite substrate at a WC loading of 152 g/L (2.5 g/in³). Cores were subsequently removed and used for testing as described above. Catalyst cores were 1" (2.54 cm) diameter by 3" (7.62 cm) long.

Examples Testing Set-up

The above described catalyst cores were placed in the test set up schematically presented in FIG. 3. Before testing all samples were initially aged at 800° C. for 16 Hrs in a flow of 90% air and 10% steam at a flow rate of 2.0±0.1 L/minute. The air flow rate was controlled by two mass flow controllers at 1.8 L/min and 0.2 L/min each for a total flow rate of 2.0±0.1 L/min. The mass flow controllers were calibrated with a Model 650 Digital Flowmeter from Fisher Scientific and the flow rate was checked before and after each aging. The water vapor content was controlled by flowing air through a saturator held at 46.1±1.5° C.

An oven temperature ramp of 5° C./min was used. The ramp went up to 845° C. and was held for 18 hours to compensate for oven and retort temperature difference, and for time delay in reaching the desired temperature in the retort aging chamber, respectively. The retort temperature was monitored by four thermocouples, two closer to the chamber door and the other two further into the chamber. A temperature difference of 20-40° C. between inside and outside thermal couples and 5-15° C. between each pair was typically observed.

To minimize variation between agings, a "dry" (without samples) run was carried out to verify set-point parameters and oven conditions before each aging.

Comparative Test Run—Example C1

Figure 4:
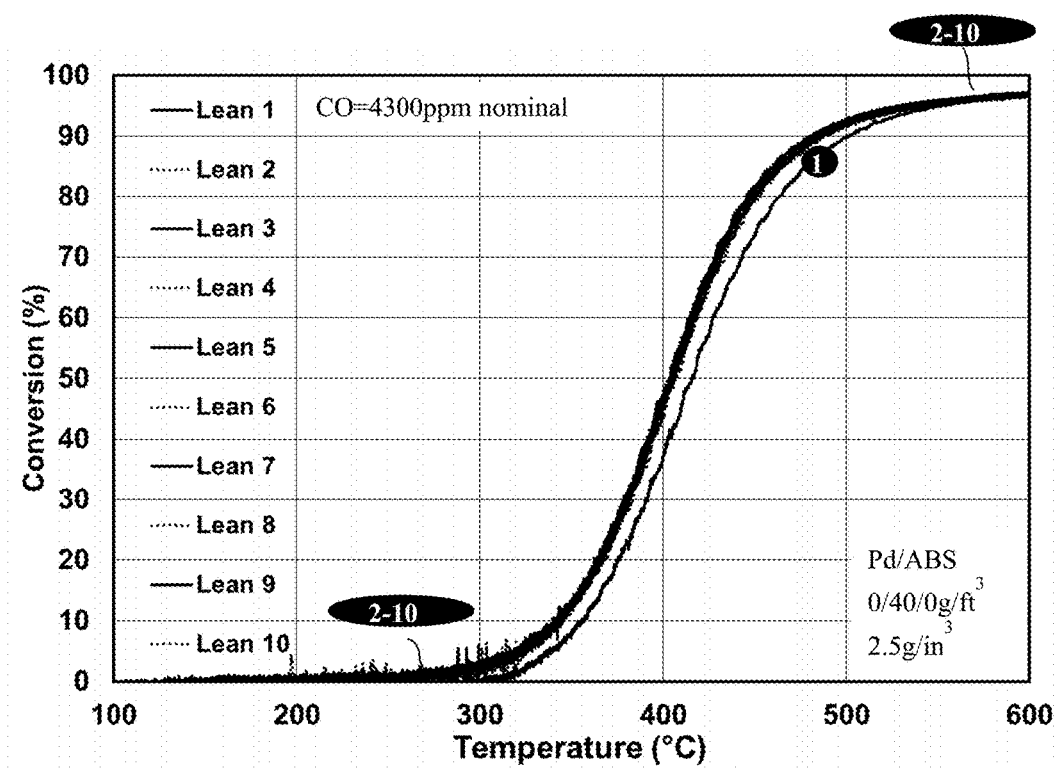
FIG. 4 shows that in the absence of $SO_2$ no further deactivation is noted after the $1^{st}$ light off test and the performance stabilizes at light off 2.

FIG 4 shows repeat light-off tests for a reference Pd CNG catalyst evaluated in the absence of $SO_2$. After the $2^{nd}$ light-off there is seen essentially no change in light-off performance showing that the catalyst is completely stable in the absence of $SO_2$. The drop-off seen for the first light-off is considered as a conventional adjustment that is associated with, for example, burn off of contaminates and an added heat treatment benefit, etc.

The comparative test run of C1 shown in FIG. 4 provides a frame of reference relative to a CO=4300 ppm "nominal" content in the exhaust flow, at a time when the catalyst has not been degraded by sulfur poisoning.

Figure 5:
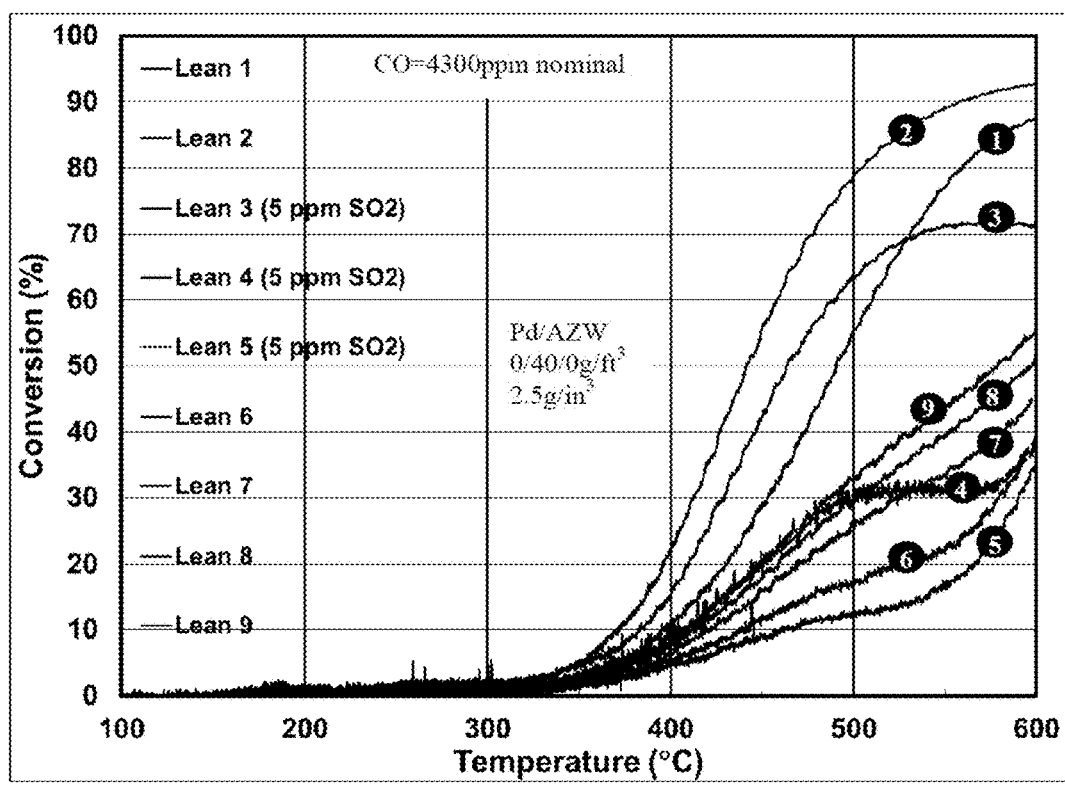
FIG. 5 shows that the introduction of $SO_2$ leads to a rapid and dramatic loss of light off activity, and that activity is not recovered after the initial S free light-off activity.

FIG. 5 shows comparative test run C2 showing the effect of adding 5 ppm $SO_2$, starting with the $3^{rd}$ light off after the $1^{st}$ and $2^{nd}$ light offs in the absence of $SO_2$. In this test run, operating under a CO=4300 ppm nominal CO gas flow, there is immediately seen a progressive and very large deactivation of the catalyst until the performance stabilizes at a highly deactivated state after the $5^{th}$ light-off. Thus, upon being degraded by sulfur poisoning the catalyst maintains the highly deactivated state.

Figure 6:
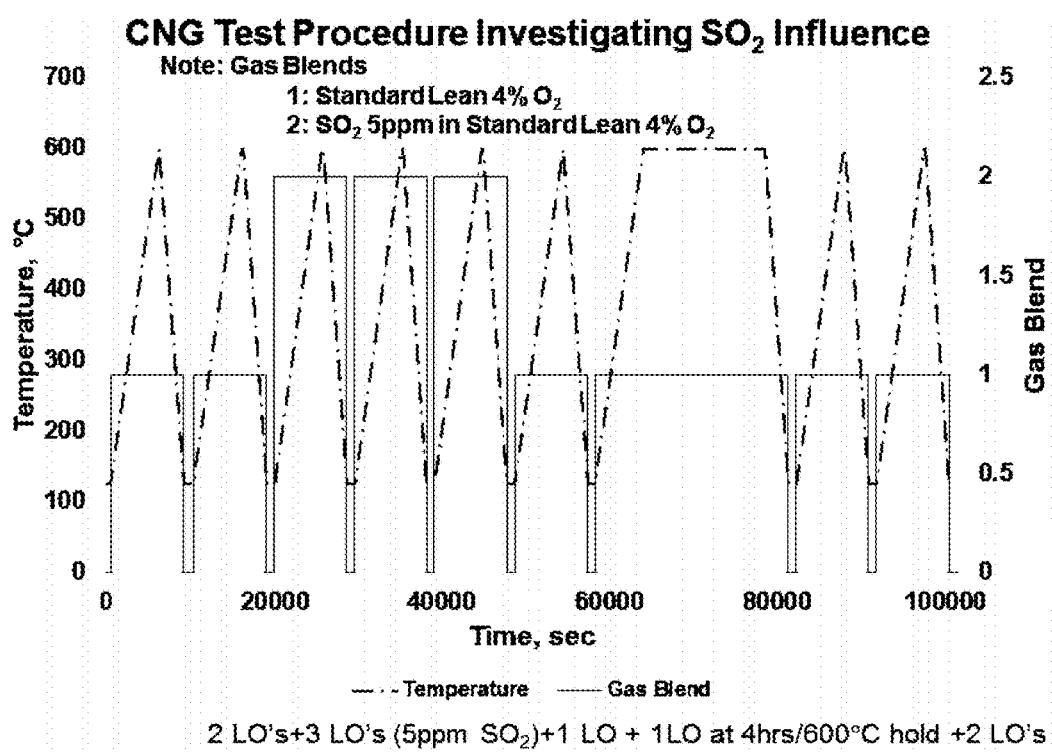
FIG. 6 shows test protocol information for CNG lean burn engine testing wherein $SO_2$ influence is investigated by utilizing a standard lean 4% $O_2$ gas blend with and without $SO_2$ addition (at 5 PPM).

FIG. 6 shows a CNG test procedure used for investigating $SO_2$ influence as well as a review to determine what impact, if any, a prolonged thermal treatment application has following sulfur poisoning. As seen by FIG. 6, there was monitored temperature fluctuations over time relative to two different types of gas blends (one with standard lean 4% $O_2$ (SL), and the other also with standard lean 4% $O_2$, but with $SO_2$, at 5 ppm, added into the standard lean 4% $O_2$ flow (SLS)). The temperature plotting shows the ramp up and down shorter duration spikes for each run but for test run 7 wherein there was an extended temperature application for 6 hours. The FIG. 6 temperature and gas blend modification illustration was carried out relative to the following sequence two light-offs (LO's) with an SL gas blend with 600° C. short intervals shown in the graph. The two lean LO's were followed under the testing procedure with three LO's under the SLS gas blend, again showing shorter 600° C. temperature spikes. The gas blend was then carried back to SL and a series of LO's were carried out inclusive of a prolonged heat treatment (4 hrs. at 600° C.). The extended duration heat treatment was then removed for the final two LO's again showing short duration 600° C. peak temperature cycles.

Figure 7:
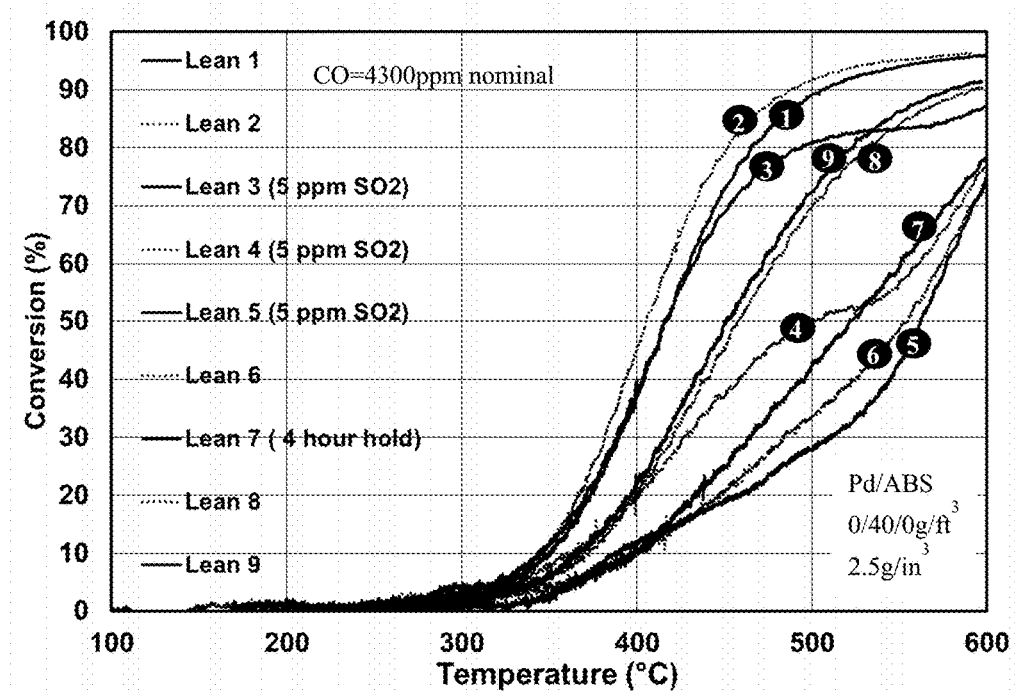
FIG. 7 shows a comparative conversion vs. temperature for methane light off involving a nominal (or non-supplemented) CO supply with examples of multiple runs inclusive of initial runs without $SO_2$ supplied, runs with $SO_2$ supplied, and subsequent light offs again without $SO_2$ supplied.

FIG. 7 provides a conversion performance for a 9 run testing sequence (comparative test run C3) carried out in accordance with the 9 run test sequence protocol shown in FIG. 6 (with run 7 thus carried out under the extended heat treatment mode of 600° C. for 4 hours). That is, FIG. 7 provides a comparison basis for analyzing $SO_2$ introduction followed by an extended duration heat treatment, without the benefit of the present invention's CO supplementation; and features a series of nine runs of the test equipment wherein a common 4300 ppm "nominal" CO content was present. The nine runs were all carried out under a lean burn status relative to the above described Pd test catalyst.

The nine lean runs shown in FIG. 7 included two light-offs without $SO_2$, three $SO_2$ poisoning light-offs (5 ppm $SO_2$) thereafter, followed by four light-offs without $SO_2$. The comparative example thus did not feature supplemental CO but only a consistent "nominal" CO amount that is considered illustrative of CO content in a non-CO-supplemented lean burn CNG engine simulated running condition. As seen, even with the addition of a thermal treatment at 600° C. for 4 hours in an effort to desulfate/reactivate the poisoned catalyst, the catalyst is not able to recover its initial sulfur free light-off activity of the catalyst. For example, as shown in FIG, 7, at 400° C. operating temperature the poisoned and subsequently thermally treated catalyst has dropped from its "lean 2" pre-poisoned level of activation of about 45% conversion of methane to a maximum post thermal treatment state at lean 9 of about 23%, and for 500° C. there is a drop from a lean 2 state of about 92% down to a lean 9 state of about 72%; still further at 600° C. there is a drop from the lean 2 state of about 97% to the lean 9 state of about 92%.

It can therefore be seen from FIG. 7 that even with a high temperature and extended in time thermal treatment of this deactivated catalyst (at 600° C. for 4 hours) in the absence of $SO_2$, there is still not seen a recovery back to performance levels initially seen in the absence of $SO_2$. In other words, a reactivation effort based on thermal treatment alone is considered to be insufficient to return the catalyst to a suitably reactivated state, particularly at typical operation temperatures.

Present Invention Examples

Figure 8:
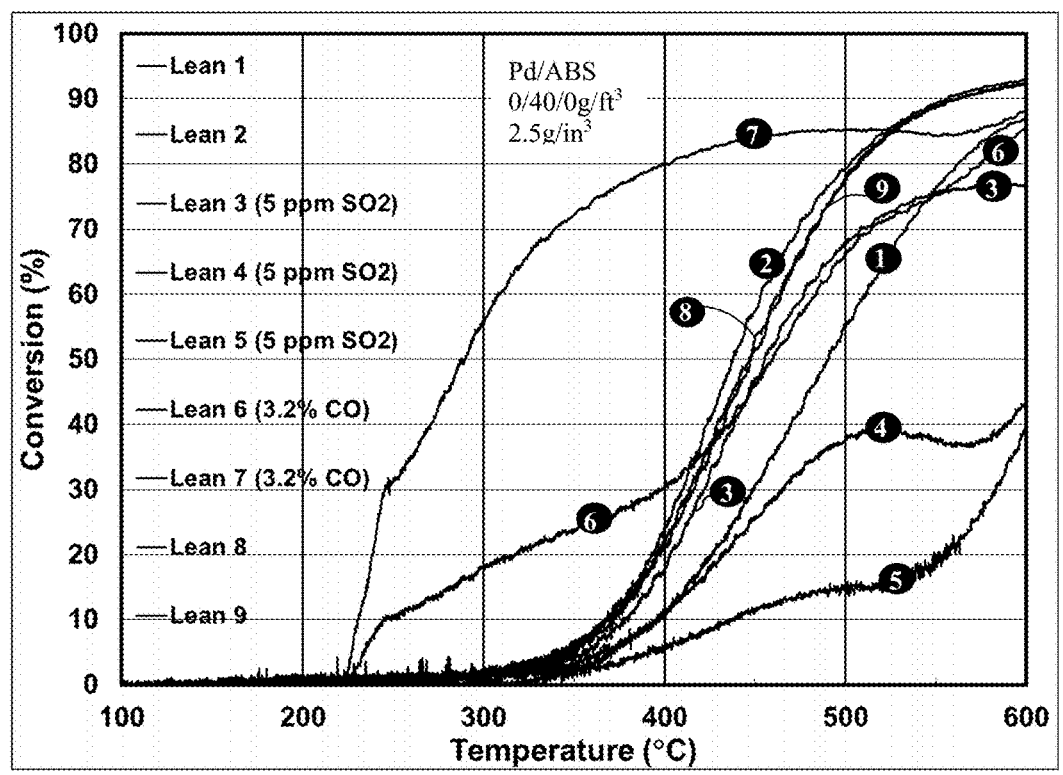
FIG. 8 shows a conversion vs. temperature methane light-off graph of the present invention which features a supplemented CO supply with multiple runs shown, inclusive of initial runs without $SO_2$ supplied, runs with $SO_2$ supplied at 5 ppm, desulfation runs with CO supplementation at 3.2%, and subsequent light offs again without $SO_2$ supplied or CO supplementation.
Figure 9:
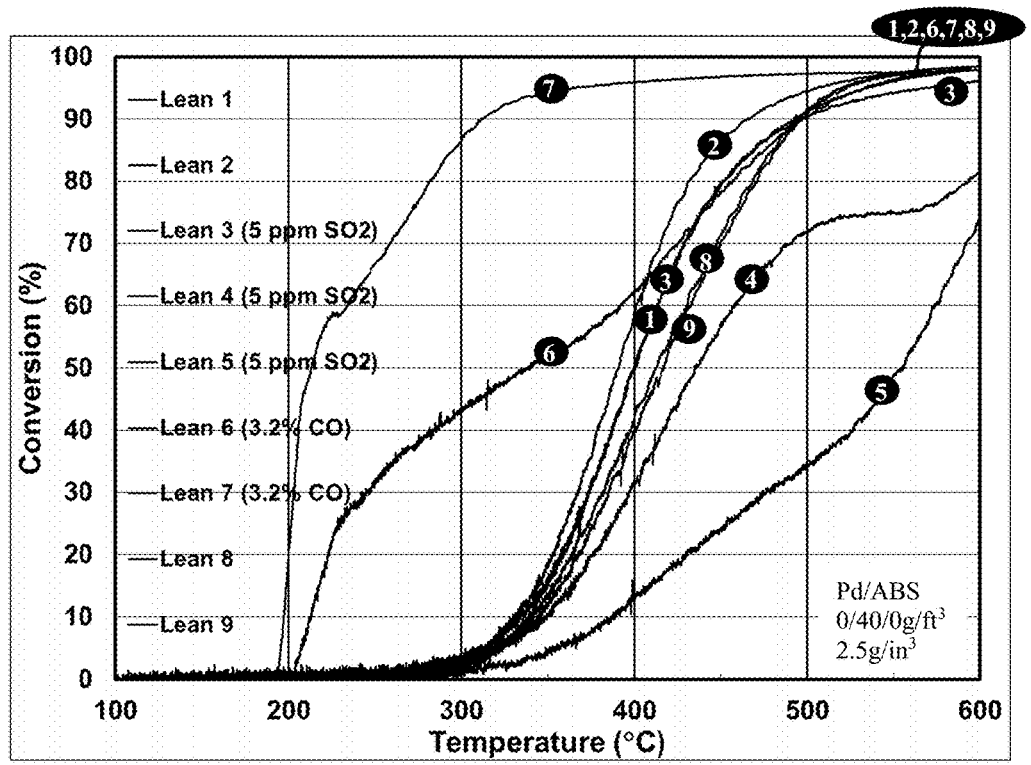
FIG. 9 shows a conversion vs. temperature 95:4:1 (methane/ethane/propane) mix light-off graph of the present invention which features a supplemented CO supply with multiple runs shown inclusive of initial runs without $SO_2$ supplied, runs with $SO_2$ supplied at 5 ppm, desulfation runs with CO supplementation at 3.2%, and subsequent light offs again without $SO_2$ supplied or CO supplementation.
Figure 10:
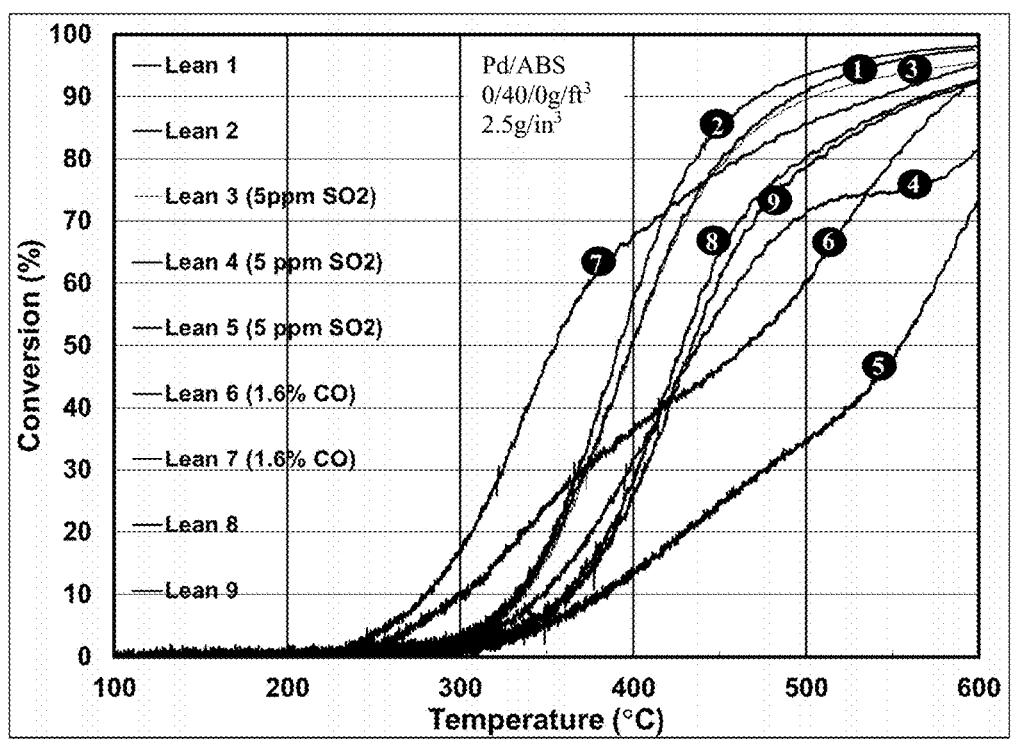
FIG. 10 shows a conversion vs. temperature 95:4:1 methane/ethane/propane mix light-off graph of the present invention at a lower CO supplementation, which features a supplemented CO supply with multiple runs shown inclusive of initial runs without $SO_2$ supplied, runs with $SO_2$ supplied at 5ppm, desulfation runs with CO supplementation at 1.6%, and subsequent light offs again without $SO_2$ supplied or CO supplementation.

To illustrate the beneficial features of the present invention, samples were tested using the enhancing CO supplementation technique of the present invention and results are shown in FIGS. 8-10. For example, in FIG. 8 there is seen nine "lean run light off series" also with an overall lean λ value of about 9.2 at the catalyst sample prior to CO supplementation (and after CO supplementation discontinuation).

As seen in FIG. 8, after two light-offs without $SO_2$ (lean 1, lean 2), three $SO_2$ at 5 ppm poisoning light-offs followed (lean 3, lean 4, lean 5). Then there was carried out two light-offs in the presence of 3.2% CO (lean 6, lean 7). Thereafter, the CO supplementation was ceased and a nominal CO supply was carried out (4300 ppm (lean 8, lean 9)) and the conversion percentage determined. As seen by FIG. 8, the CO supplementation at a level of 3.2% CO in runs 6 and 7 that took place following the initial sulfur poisoning at 5 ppm $SO_2$ in runs 3, 4 and 5, resulted in a drastic improvement in light off temperatures and the final recovery approaches that of the first light off lean 1. Again the overall λ value was retained in a lean state relative to the tested catalyst sample environment. For example, during the CO supplementation at 3.2% the overall lean state was maintained at about 2.2λ, which is down from the initial about 9.2λ running state prior to supplementation, but well within a general lean run state, FIG. 8 also shows a sequenced, stepped increase in activity following each CO supplementation run (lean 6, lean 7), with lean 6 showing a light off occurring at a much lower temperature, and a greater than 50% conversion performance at 500° C. (e.g., about 65%). Upon completion of the CO supplementation run of lean 7, there can be seen a significant recovery at the lower temperatures as compared to the sulfur runs of 3 to 5, together with a conversion % of about 85% at 500° C. Post CO supplementation runs, lean 8 and lean 9, are also shown not to degrade that much with about a retained 80% at 500° C. Still further, at 400° C., and following completion the CO supplementation shown in lean run, the conversion level is about the same as that of lean 2 (e.g., within 5%), with the final lean 9 being even closer (e.g., less than 5% differential). Accordingly it can be seen from the FIG. 8 plotting that the presence of 3.2% CO decreases the light off temperatures drastically and the final recovery is about the same as the first light off.

As further seen from a comparison of the results of FIG. 8 with the results of FIG. 7, the use of high CO concentrations in the exhaust is more efficient for catalyst recovery/regeneration that just a simple thermal treatment such as that attempted in the comparative testing above. The added. CO has a special and unique reactivation feature not seen by just using an overall heat or thermal application treatment alone.

FIG. 9 further illustrates the significant benefits both in a decrease in initial light off temperatures as well as overall conversion performance by plotting nine "lean runs". The light off runs in FIG. 9 were the same as the previous FIG. 8 runs, except 100% methane was replaced by a 95-4-1 mixture (95% methane, 4% ethane, and 1% propane). As before, the presence of 3.2% CO decreases the light off temperatures drastically, even more than a methane only supply; and the final recovery is close to the first light off. For example, as shown in FIG, 9, for the post CO supplement lean 8 run at about 425° C. there is about 55% conversion which is well above the sulfur degraded run of about 17% for lean 5. Also, at 400° C. it can be seen that the lean 9 is within about 7% of lean 1 and within 15% of the maximum lean 2, while the lean run 5, at this temperature of 400° C. ,drops to 13% conversion. There is achieved conversion of about 43% at lower temperature of 300° C.' in the initial CO supplementation (lean 6) and over 40% conversion at 200° C.; for (lean 7). Still further, lean run 7 achieved about 85% conversion at 300° C. and about 97% at 500° C.

Again, even after discontinuing the CO supplementation runs of 6 and 7 at 3.2%, the runs of lean 8 and 9, without CO Supplementation, still retained good performance as compared to the lean runs 4 and 5. For example, lean runs 8 and 9 retained 60% conversion performance at about 425° C. and about 90% conversion performance at 500° C.

FIG. 10 shows an additional nine light off runs under the above described lean λ condition and with the same test conditions as with the previous FIG. 9 runs, except the CO concentration was decreased to 1.6% for light-offs/lean runs 6 and 7. The presence of 1.6% CO provided a desulfation effect, but to a lesser degree as compared to 3.2% CO. Also, the X value for the 1.6% CO runs about 3.9 which is well within the overall lean state desired under the present invention. The light off temperatures of lean 6 and lean 7 runs with 1.6% CO show improvements as compared to the thermally degraded lean 4 and 5, but a shift to the right in the temperature line as compared to the 3.2% runs. Moreover, at 500° C. the lean run 7 with 1.6% CO still has about 85% conversion, and the subsequent lean runs 8 and 9 show a retention of conversion performance (in excess of about 80% at 500° C.) after the CO supplementation is discontinued.

Further, the testing shown in the present invention CO supplementation process, illustrated in FIGS. 8 to 10 shows that despite water (as represented by the supplied water vapor) being a strong inhibitor on the catalytic activity of methane oxidation, the additional CO in the exhaust is still able to improve the catalytic performance despite the presence of 10% water (See Table 1 above).

Figure 11:
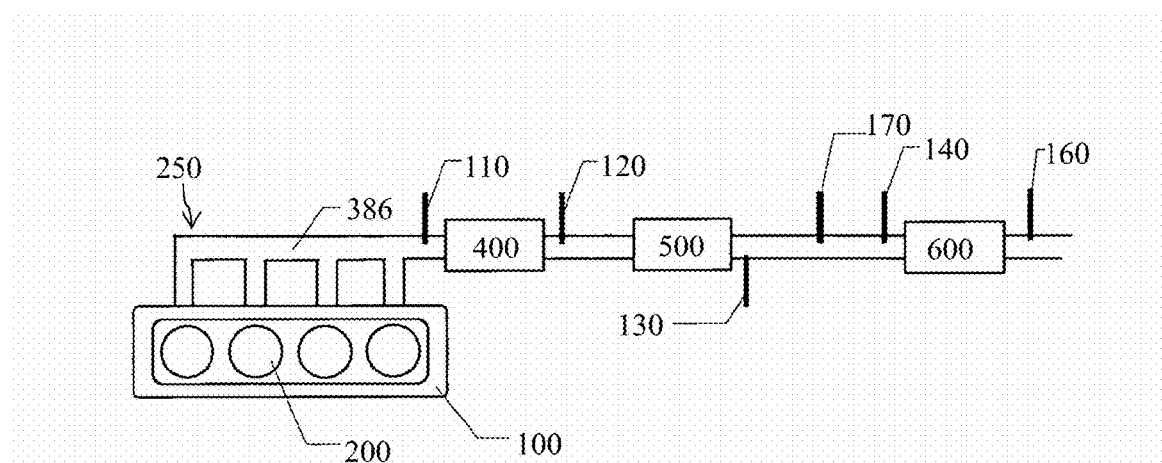
FIG. 11 shows an additional example of the present invention featuring a multi-catalyst system with at least the first or upstream catalyst operating under a CO supplemented exhaust atmosphere.

FIG. 11 shows an example of a catalytic system 250 suited for an exhaust passageway of a lean burn engine such as a lean burn CNG fuel supply engine 100 having cylinders 200 (four shown with CO supplementation of some or all of the four featured) as well as manifold 386 leading to upstream oxidation catalyst 400 of the type described in FIG. 1 together with one or more downstream exhaust catalyst devices for further exhaust emission clean up. For example, a representative of downstream catalyst 500 includes an $NO_x$ removal catalyst such as a nitrogen storage catalyst NSC or an SCR catalyst 600 or two SCR catalysts, two nitrogen storage catalysts or a reverse order SCR (500) and NSC (600) or alternatively an upstream or downstream particle filter (a non-catalyzed or catalyzed particle filter such as those used to address particle filters in gas (smaller particles) or diesel (larger particles) running engines) and a corresponding NSC or SCR. Also, the catalyst 400 can be moved further downstream with or without catalysts 500 and/or 600, upstream or downstream thereof (with many situations favoring a close coupled higher temperature setting for catalyst 400). Suitable upstream and/or downstream monitoring sensors such as those described above can be provided as represented by sensors 110, 120, 130, 140, and 160 (with reference number 170 representing an ammonia or ammonia precursor supplier, as in urea supplier for an SCR catalyst that is particularly useful in situations where 600 is an SCR catalyst utilizing, for example, urea in $NO_x$ reduction. Various other catalyst and falter combinations are featured under the present invention relative to systems that run with the above described catalyst treatment apparatus of the present invention having supplementation means S for removing poison build up in a catalyst associated with the supplementation means S.

While reference is made in the examples above to one or more cylinders of a combustion engine, the catalytic treatment apparatus CTA of the present invention is also suited for use in other combustion devices as in a combustion chamber of a power plant used to generate heat (e.g., for steam turbine running) and which is fueled by a methane source fuel such as natural gas (having a potential catalyst poisoning sulfur content). The scope of the present invention is thus inclusive of the noted catalytic treatment apparatus CTA and also systems making use of the catalytic treatment apparatus, with the above described CNG engine being one example of such a system, and the NG stationary power plant providing an additional example of a system making use of the catalytic treatment apparatus of the present invention.

Figure 12:
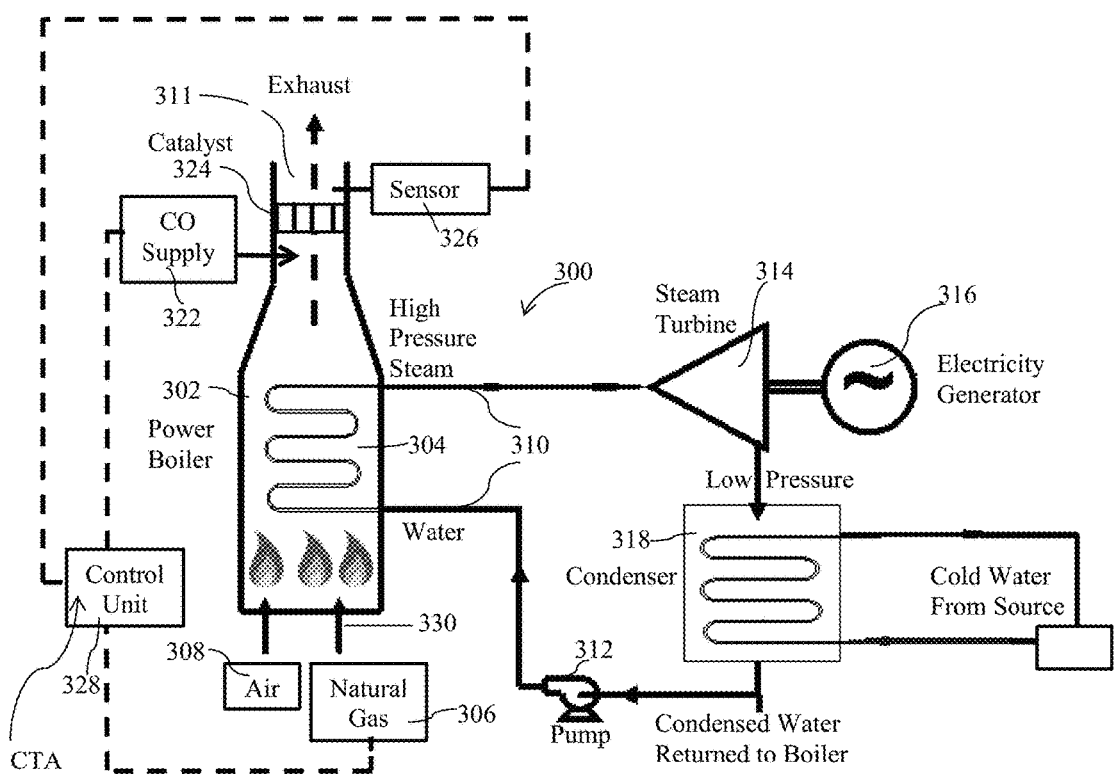
FIG. 12 shows an additional example of the present invention with the combustion device being an NG stationary power plant.

For example, FIG. 12 shows power plant assembly 300 representing a further example of the present invention. That is, as shown in FIG. 12 there is power plant assembly 300 comprising a power boiler 302 having a combustion chamber 304 to which there is provided a methane source fuel supply apparatus 306 (such as a natural gas feed with flow controlled supply). An air feed is also supplied via air intake 308, with the combination being subject to combustion in the chamber 304, and the exhaust gas generated exiting via exhaust passageway 311. The heat of combustion is used to heat water travelling in water/high pressure stream line 310 which is circulated via pump 312. The high pressure steam generated on the exit side from the combustion chamber is fed to steam turbine 314 which powers electricity generator 316. The steam flow exiting the turbine is fed to condenser 318 wherein a cool water source 320 (e.g., a lake or ocean) is fed in heat exchange fashion in the condenser to turn the circulation steam to water to be re-fed to the combustion chamber.

FIG. 12 further reveals a version of the catalytic treatment apparatus CTA with its supplementation apparatus S featuring a CO source supplier 322 that is positioned for exhaust stream supply upstream of the Pd based oxidation catalyst device 324 having catalytic qualities like that described above for catalyst device 40 (albeit catalyst device 40 typically being on a smaller scale) in the FIG. 1 embodiment. While other (standard and thus not shown) sensing means are typically provided for a system power plant such as that shown in FIG. 12, the CTA for the power plant system 300 under the present invention features sensor 326, which is similar to the FIG. 1 referenced sensor 42 (e.g., a direct methane level sensor which can determine the extent of methane bypass past catalyst 324). There is also featured under the illustrated CTA control unit 328 in communication with sensor 326 as well as with a flow amount controller 330 associated with the methane source fuel supply apparatus 306 and the CO source supplier 322. As in the earlier embodiment, the supplemental apparatus S of the present embodiment makes use of components utilized for normal run operation while also including modifications (e.g., the addition of a stand alone CO source rather than relying on a normal run fuel source for CO supplementation, the addition of receiver and transmission units to valving, and/or modifications/supplementations made to a preexisting control unit or the addition of a stand alone control unit device dedicated to the CTA only). The CO supplementation apparatus or means S is designed to provide for a CO supplement effect in the exhaust reaching catalyst 324.

As with the earlier described arrangement, the control unit 328 shown in the CTA is designed to provide a supplemental CO content above that which is a nominal amount for proper combustion conditions at the given time or period. This added CO content functions in the manner described above to reactivate a sulfur poisoned catalyst (e.g., a sulfur build up on the catalyst due to the typical sulfur content in natural gas supply of 1 to 5 ppm) by localized exotherm regions provided by the added CO content while still running under an overall lean running state. The above described relative supply amounts leading to the aforementioned ranges of CO supplementation are applicable (as in 3.0 to 4.0% CO content leading to the Pd based catalyst 324). The control unit functions to supplement the CO content based on the readings of sensor 326 which is designed to sense for when catalyst 324 has been degraded by sulfur build-up, and to provide via the supplementation apparatus S which in this embodiment includes valving that is in communication with a fuel source 322 and also in communication with the control unit to provide a greater than normal CO supply in the exhaust stream. Thus, with the supplemental apparatus S, the CO content in the exhaust flow is supplemented for a sufficient time to achieve a desired level of reactivation in the poisoned catalyst when sensor 326 indicates that the level of methane slip has increased to a predetermined level as to trigger desulfation).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Also, the features presented in one embodiment described above can be carried over to other disclosed embodiments under the present invention, where appropriate, as in the use of the feature of a stand-alone CO supplier in the FIG. 12 embodiment being utilized in the first embodiment and vice versa (e.g., an NG increase in the FIG. 12 embodiment over what would be utilized for normal run mode to generate for a period a larger CO content in the exhaust flow in generally similar fashion as in the FIG. 1 embodiment). Thus, it is intended that the scope of the present invention herein disclosed should not be limited by the particular disclosed embodiments described above, but should be determined only by a fair reading of the claims.

What is claimed is:

1. An apparatus for catalytic treatment of exhaust from a lean burn, methane sourced fuel combustion device, comprising:
    an exhaust line adapted for receipt of exhaust from the combustion device;
    a catalyst positioned for contact with exhaust traveling in the exhaust line;
    a methane level sensor downstream of the catalyst;
    a control unit;
    a CO supplementation apparatus in communication with the control unit and adapted to supplement CO content in the exhaust reaching the catalyst, while avoiding an overall rich exhaust atmosphere at the catalyst, so as to desulfate the catalyst, and
    wherein the catalyst is a Pd-based catalyst.

2. The apparatus of claim 1 wherein the catalyst comprises Pd and at least a second metal.

3. The apparatus of claim 2 wherein the second metal is Pt.

4. The apparatus of claim 1 wherein the CO supplementation apparatus supplements the CO exhaust content by adding fuel to the CO supplementation apparatus during a combustion state in the combustion device while retaining an overall lean burn state at the catalyst during CO supplementation.

5. The apparatus of claim 4 wherein the CO supplementation apparatus operates such that the lean state of the exhaust reaching the catalyst during supplementation is retained at or greater than lambda 1.1.

6. The apparatus of claim 5 wherein the CO supplementation apparatus operates such that the percentage of CO content in the exhaust is 1.0% to <7.5% during supplementation.

7. The apparatus of claim 1 wherein the CO supplementation apparatus provides a percentage of CO content in the exhaust that is 2.0% to 6.0% CO during supplementation and while the exhaust is in a lean state at the catalyst.

8. The apparatus of claim 7 wherein the CO supplementation apparatus provides a CO content in the exhaust that is 2.5 to 4.0% CO by volume during supplementation and while the exhaust is in a lean state at the catalyst.

9. The apparatus of claim 1 wherein the CO supplementation apparatus includes a fuel injector device.

10. The apparatus of claim 9 wherein the combustion device comprises a lean burn engine and the fuel injector device of the CO supplementation apparatus supplies less than a total number of combustion chambers of the lean burn engine with added fuel.

11. The apparatus of claim 9 wherein the combustion device comprises a lean burn engine and the fuel injector device is in communication with the control unit and is adapted to add fuel to one or more combustion chambers of the lean burn engine.

12. The apparatus of claim 11 wherein the fuel injector device feeds a fuel in common with an operation fuel of the lean burn engine.

13. The apparatus of claim 1 further comprising a catalyst sulfur deactivation sensor in communication with the control unit.

14. The apparatus of claim 13 wherein the deactivation sensor conveys information to the control unit informative of a level of sulfur deactivation of the catalyst, and, when the control unit determines a threshold value of sulfur deactivation has occurred, initiates the CO supplemental apparatus to supplement the exhaust flow with added CO.

15. The apparatus of claim 14 wherein the initiation of the CO supplementation apparatus includes the triggering of an additional supply of methane source fuel through one or more valves opened by the control unit.

16. The apparatus of claim 1 wherein the catalyst has Pd alone as PGM material or Pd/Pt in a Pd/Pt ratio of 3:1 to 10:1 as the PGM material.

17. A method of assembling the catalytic treatment apparatus of claim 1, comprising:
    providing the catalyst in the exhaust line so as to be positioned for contact with the exhaust of the lean burn combustion device, and
    setting up the control unit for control communication with the CO supplementation apparatus.

18. A system for rejuvenation of a catalyst, comprising:
    the apparatus of claim 1;
    the lean burn, methane sourced fuel combustion device; and
    a natural gas fuel source as a methane sourced fuel to be supplied to the combustion device, and
    wherein exhaust from the combustion device is received in said exhaust line.

19. The system of claim 18 wherein the natural gas fuel source is a CNG fuel source and the combustion device is an engine of a moveable vehicle.

20. The system of claim 18 wherein the combustion device is a stationary power plant boiler.

21. An apparatus for catalytic treatment of exhaust from a lean burn, methane sourced fuel combustion device, comprising:

an exhaust line adapted for receipt of exhaust from the methane sourced fuel combustion device;

a catalyst positioned for contact with exhaust traveling in the exhaust line;

a methane level sensor downstream of the catalyst;

a control unit;

CO supplementation means, in communication with the control unit, for supplementation of CO content in the exhaust reaching the catalyst, while avoiding an overall rich exhaust atmosphere at the catalyst, so as to desulfate the catalyst, and wherein the catalyst is a Pd-based catalyst.

22. The apparatus of claim 21 wherein the catalyst is positioned in the exhaust line as to be a first in line catalyst to receive supplemental CO generated by the CO supplementation means.

23. An apparatus for catalytic treatment of exhaust from a lean burn, methane sourced fuel combustion device, comprising:

an exhaust line adapted for receipt of exhaust from the combustion device;

a catalyst positioned for contact with exhaust traveling in the exhaust line;

a methane level sensor downstream of the catalyst;

a control unit;

a CO supplementation apparatus in communication with the control unit and adapted to supplement CO content in the exhaust reaching the catalyst, while avoiding an overall rich exhaust atmosphere at the catalyst, so as to desulfate the catalyst, and wherein the CO supplementation apparatus operates such that the lean state of the exhaust reaching the catalyst during supplementation is retained at or greater than lambda 1.1.

24. A method of enhancing a catalyst performance in a lean burn, methane source fueled combustion device, comprising:

monitoring methane breakthrough downstream of the catalyst; and supplementing to a predetermined level CO content of the lean burn combustion device exhaust through the use of a control unit in response to the breakthrough so as to rejuvenate the catalyst while retaining an overall lean burn state in the exhaust reaching the catalyst during CO supplementation.

25. The method of claim 24 wherein the CO percentage by volume is 2.5% to 4.0% CO during supplementation while retaining the exhaust gas at an overall lean state at the catalyst during CO supplementation.

26. The method of claim 24 wherein the catalyst is a Pd-based catalyst.

27. The method of claim 26 wherein the rejuvenation includes supplementing CO content reaching the catalyst so as to have CO percentage by volume of 2.0% to 6.0% CO during supplementation while retaining the exhaust gas at an overall lean state at the catalyst during CO supplementation.

28. The method of claim 26 wherein the rejuvenation includes desulfation of the Pd inclusive catalyst by way of the CO supplementation, and the Pd based catalyst has Pd alone as PGM material or Pd/Pt in a Pd/Pt ratio of 3:1 to 10:1 as the PGM material.

29. The method of claim 24 wherein the CO supplementation is carried out by supplying additional fuel to one or more combustion chambers of the methane source fueled combustion device in the form of a lean burn engine of a mobile vehicle.

30. The method of claim 29 wherein the CO supplementation is carried out by supplying a fuel source, that is also used as a fuel source for normal engine running, to less than all available combustion chambers of the lean burn engine.

31. The method of claim 30 herein the methane source fuel is CNG.

* * * * *